US011915550B2

(12) United States Patent
Emeric et al.

(10) Patent No.: US 11,915,550 B2
(45) **Date of Patent: *Feb. 27, 2024**

(54) SYSTEM, CHIP TRAY, AND METHOD

(71) Applicant: ANGEL GROUP CO., LTD., Shiga (JP)

(72) Inventors: Jason Emeric, Las Vegas, NV (US); Jeffrey Reed, Sunman, IN (US); Gregory Gronau, Las Vegas, NV (US); Yasushi Shigeta, Shiga (JP); Emmanuel Sylvain Gelinotte, Savigny les Beaune (FR); Jonathan Souillot, Saint-Marcel (FR); Bernard Molina, Las Vegas, NV (US)

(73) Assignee: ANGEL GROUP CO., LTD., Shiga (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/884,811

(22) Filed: Aug. 10, 2022

(65) Prior Publication Data

US 2022/0392302 A1 Dec. 8, 2022

Related U.S. Application Data

(63) Continuation of application No. 17/283,672, filed as application No. PCT/US2019/055375 on Oct. 9, 2019, now Pat. No. 11,450,173.

(Continued)

(51) Int. Cl.
*G07F 17/32* (2006.01)

(52) U.S. Cl.
CPC ........ *G07F 17/3225* (2013.01); *G07F 17/322* (2013.01)

(58) Field of Classification Search
CPC ............... G07F 17/3225; G07F 17/322; A63F 3/00157; A63F 2003/00703;
(Continued)

(56) References Cited

U.S. PATENT DOCUMENTS 5,757,876 A 5/1998 Dam et al.
9,779,582 B1 10/2017 Ben Hanan et al.
(Continued)

FOREIGN PATENT DOCUMENTS

EP 2595093 A2 5/2013
EP 3324374 A1 5/2018
(Continued)

OTHER PUBLICATIONS

International Search Report dated Jan. 2, 2020 issued in PCT Application PCT/US2019/055375.
(Continued)

*Primary Examiner* — Pierre E Elisca
(74) *Attorney, Agent, or Firm* — NORTON ROSE FULBRIGHT US LLP

(57) ABSTRACT

A chip tray system can include multiple chip tube components. A first chip tube component in the chip tray can include one or more gaming chip storage rows corresponding to a first size of gaming chip. A second chip tube component in the chip tray can include one or more gaming chip storage rows corresponding to a second size of gaming chip. An edge of the first chip tube component can be coupled to an edge of the second chip tube component.

18 Claims, 21 Drawing Sheets

Related U.S. Application Data

(60) Provisional application No. 62/743,451, filed on Oct. 9, 2018.

(58) Field of Classification Search
CPC .... A63F 2003/00839; A63F 2009/2489; A63F 2011/0006; A63F 11/0002; G07D 9/002; G07D 9/02
USPC ............................................................ 463/25
See application file for complete search history.

(56) References Cited

U.S. PATENT DOCUMENTS

| | | | | |
|---|---|---|---|---|
| 2004/0087375 | A1* | 5/2004 | Gelinotte ............ | G07F 17/3251 463/47 |
| 2010/0093429 | A1 | 4/2010 | Mattice et al. | |
| 2012/0080845 | A1 | 4/2012 | Emori et al. | |
| 2012/0241344 | A1* | 9/2012 | Gronau ................. | G07F 7/0893 206/445 |
| 2013/0168449 | A1* | 7/2013 | Lee .................... | G06K 7/10336 235/439 |
| 2014/0291399 | A1* | 10/2014 | Koyama ............ | G06K 7/10336 235/439 |
| 2017/0061735 | A1 | 3/2017 | Kotab | |
| 2018/0075690 | A1 | 3/2018 | Moore et al. | |
| 2018/0185741 | A1 | 7/2018 | Shigeta | |
| 2019/0005767 | A1* | 1/2019 | Shigeta ............... | G07F 17/3206 |
| 2019/0392273 | A1 | 12/2019 | Shigeta | |
| 2020/0394480 | A1 | 12/2020 | Shigeta | |

FOREIGN PATENT DOCUMENTS

| | | | |
|---|---|---|---|
| JP | 2014504164 | A | 2/2014 |
| JP | 2018130183 | A | 8/2018 |
| WO | 2012058401 | A2 | 5/2012 |
| WO | 2018147451 | A1 | 8/2018 |

OTHER PUBLICATIONS

European Search Report dated Jun. 10, 2022 issued in EP Application 19870579.0.

Japanese Office Action dated Jul. 4, 2023 issued in JP Application No. 2022-118360.

Japanese Office Action dated Aug. 1, 2023 issued in JP Application No. 2021-520416.

* cited by examiner

SYSTEM, CHIP TRAY, AND METHOD

CROSS REFERENCE TO RELATED APPLICATIONS

The present application is a continuation of U.S. patent application Ser. No. 17/283,672 filed Apr. 8, 2021, which is a national phase application under 35 U.S.C. § 371 of International Pat. App. No. PCT/US2019/055375 filed Oct. 9, 2019, which claims priority to U.S. Prov. App. No. 62/743,451 filed Oct. 9, 2018, each of which is incorporated herein by reference without disclaimer.

FIELD

The present disclosure relates to a new system having a gaming chip storage row for storing gaming chips, a chip tray and a method.

BACKGROUND

A chip tray can be used to store gaming chips for a dealer of a wagering game. The chip tray can store different denominations of gaming chips in a safe place. Chip trays can be made from various materials including plastic and metal.

During the last 2 decades, the casino industry has been using the RFID technology to protect and track their currency products also called plaques and chips which are token that have a face value to allow gambling, payouts. The RFID tags provide a unique identifier to each item and also typically include a ROM memory to store the specific information of the currency product. The chips are stored in some trays at the gaming tables. For big gambling games such as Baccarat, the Casino use dual level chip trays. Using RFID in the tags gives the possibility for the Casino to have live inventory of these floats. The opening systems of these dual level floats is generally based on 2 handles and no assistance making it difficult to open when the float has many chips (up to 2000).

SUMMARY

The present disclosure aims at providing a system changing an amount of storage for various kinds of gaming chips, a chip tray and a method.

An aspect of the present disclosure is a system including a first chip tube component comprising at least one first gaming chip storage row corresponding to a first size of gaming chip; and a second chip tube component comprising at least one second gaming chip storage row corresponding to a second size of gaming chip, wherein a first edge of the first chip tube component is coupled to a second edge of the second chip tube component.

An aspect of the present disclosure is a chip tray comprising: a first chip tube component comprising at least one first gaming chip storage row corresponding to a first size of gaming chip; and a second chip tube component comprising at least one second gaming chip storage row corresponding to a second size of gaming chip, wherein a first edge of the first chip tube component is coupled to a second edge of the second chip tube component.

An aspect of the present disclosure is a method comprising, coupling a first chip tube component to a second chip tube component; coupling a third chip tube component to the second chip tube component to form a plurality of coupled chip components; and positioning the plurality of coupled chip components in an enclosure.

With 2 handles, the opening is not synchronized. The invention consists in installing a mechanism to help the upper tray open in a guided way and assist the opening of the tray without creating a risk of maintenance issues.

The mechanism is based on 3 principles: (1) a single bar that links the left and the right of a tray to open. The important part is to have a system linking the left side to the right side to have a guided opening; (2) a lever system to reduce the efforts when opening; and (3) a spring linked to the lever system to help the beginning of the movement when opening and closing the tray.

Such a system gives the possibility to open the tray with one hand while the second hand picks a chip from the bottom tray. This feature saves time to the Dealer while keeping the high denomination chips in a protected area in the bottom tray.

The invention can also give the possibility to have several compartments in the tray and therefore to open only parts of the upper tray. This way, the access to some compartments can also be blocked by access control devices.

Integrating sensors gives the possibility to have software control of the opening, the traceability and securing the content of the float.

BRIEF DESCRIPTION OF THE DRAWINGS

For a more complete understanding of the embodiments and the advantages thereof, reference is now made to the following description, in conjunction with the accompanying figures briefly described as follows.

DETAILED DESCRIPTION

Figure 1:
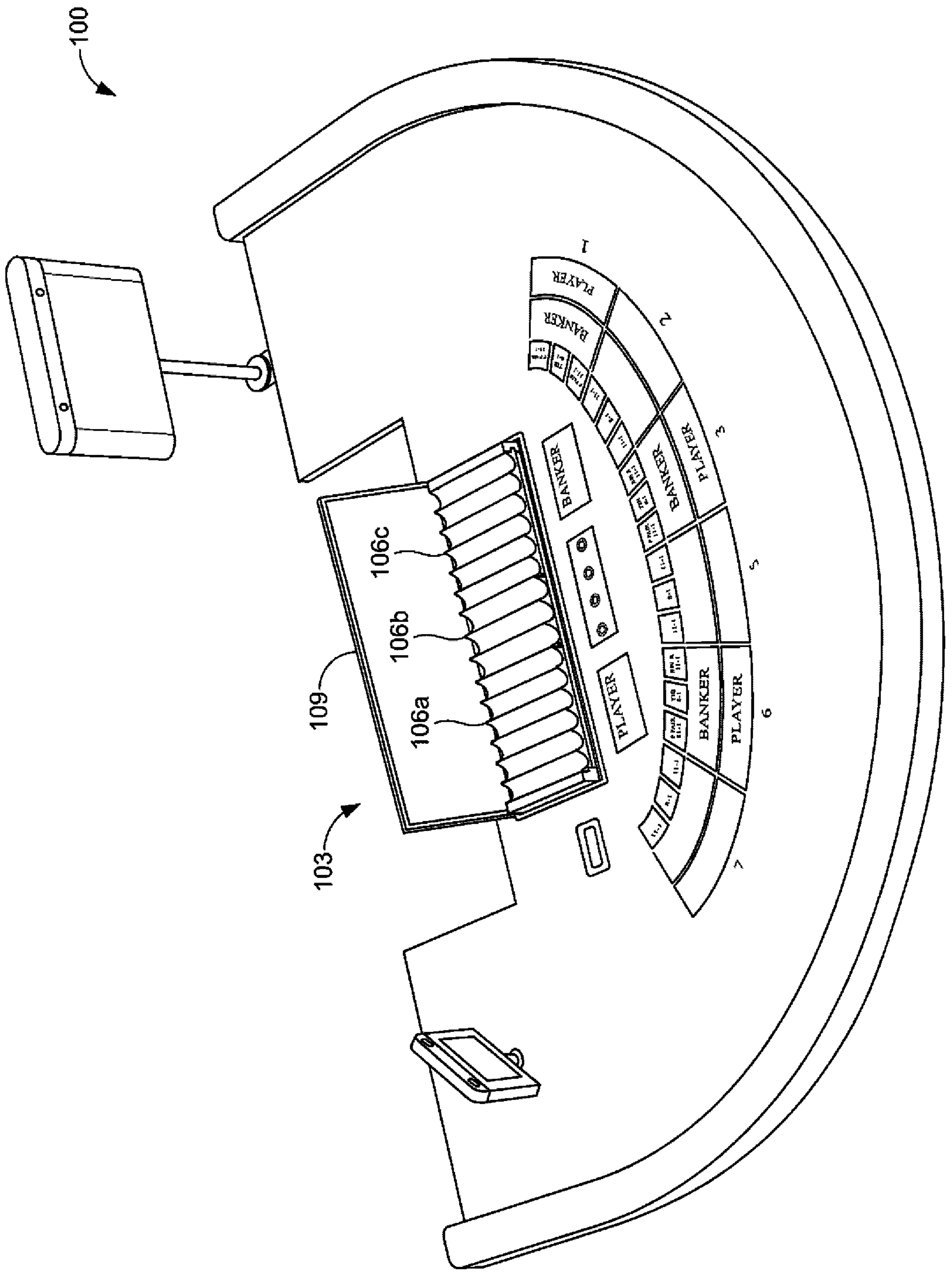
FIG. 1 is a drawing of a gaming table according to various example embodiments.

The drawings illustrate only example embodiments and are therefore not to be considered limiting of the scope described herein, as other equally effective embodiments are within the scope and spirit of this disclosure. The elements and features shown in the drawings are not necessarily drawn to scale, emphasis instead being placed upon clearly illustrating the principles of the embodiments. Additionally, certain dimensions may be exaggerated to help visually convey certain principles. In the drawings, similar reference numerals between figures designate like or corresponding, but not necessarily the same, elements.

In the following paragraphs, the embodiments are described in further detail by way of example with reference to the attached drawings. In the description, well known components, methods, and/or processing techniques are omitted or briefly described so as not to obscure the embodiments. As used herein, the "present disclosure" refers to any one of the embodiments described herein and any equivalents. Furthermore, reference to various feature(s) of the "present embodiment" is not to suggest that all embodiments must include the referenced feature(s).

Among embodiments, some aspects of the present disclosure are implemented by a computer program executed by one or more processors, as described and illustrated. As would be apparent to one having ordinary skill in the art, one or more embodiments may be implemented, at least in part, by computer-readable instructions in various forms, and the present disclosure is not intended to be limiting to a particular set or sequence of instructions executed by the processor.

The embodiments described herein are not limited in application to the details set forth in the following description or illustrated in the drawings. The disclosed subject matter is capable of other embodiments and of being practiced or carried out in various ways. Also, the phraseology and terminology used herein is for the purpose of description and should not be regarded as limiting. The use of "including," "comprising," or "having" and variations thereof herein is meant to encompass the items listed thereafter, additional items, and equivalents thereof. The terms "connected" and "coupled" are used broadly and encompass both direct and indirect connections and couplings. In addition, the terms "connected" and "coupled" are not limited to electrical, physical, or mechanical connections or couplings. As used herein the terms "machine," "computer," "server," and "work station" are not limited to a device with a single processor, but may encompass multiple devices (e.g., computers) linked in a system, devices with multiple processors, special purpose devices, devices with various peripherals and input and output devices, software acting as a computer or server, and combinations of the above.

The term gaming chips, as used herein, can include any chip, plaque, jeton, or other gaming currency that may be used in a casino, gaming room, or digital game. Each gaming chip can represent a value that is predetermined or not. The gaming chips can be made from a rigid plastic material or clay to obtain a structure that is solid enough to resist conditions of use in casinos. The gaming chips can be used throughout a casino. For example, at gaming tables, gaming chips can be received for play or the conclusion of a game or hand, cash can be received and gaming chips paid out (buy-in), and gaming chips may be paid out during play. In a cashier area, gaming chips can be received and cash can be paid out (cash out). Alternatively, cash can be received and gaming chips can be paid out (buy-in).

Turning now to the drawings, exemplary embodiments are described in detail. With reference to FIG. 1, shown is a gaming table 100 according to various embodiments of the present disclosure. The gaming table 100 includes a chip tray 103 among other components. The chip tray 103 can include one or more chip tube components 106, such as, for example, chip tube components 106*a*, 106*b*, and 106*c*. An enclosure of the chip tray 103 can include a lockable lid 109.

The chip tray 103 can be covered by a lid 109 that can be locked to limit access to the chip tray 103. When a wagering game is active, the lid 109 can be completely removed. Similarly, when the gaming table is open, the lid 109 can be unlocked so that an employee can lift it if desirable. When the wagering game is closed, the lid 109 can be locked.

Figure 2:
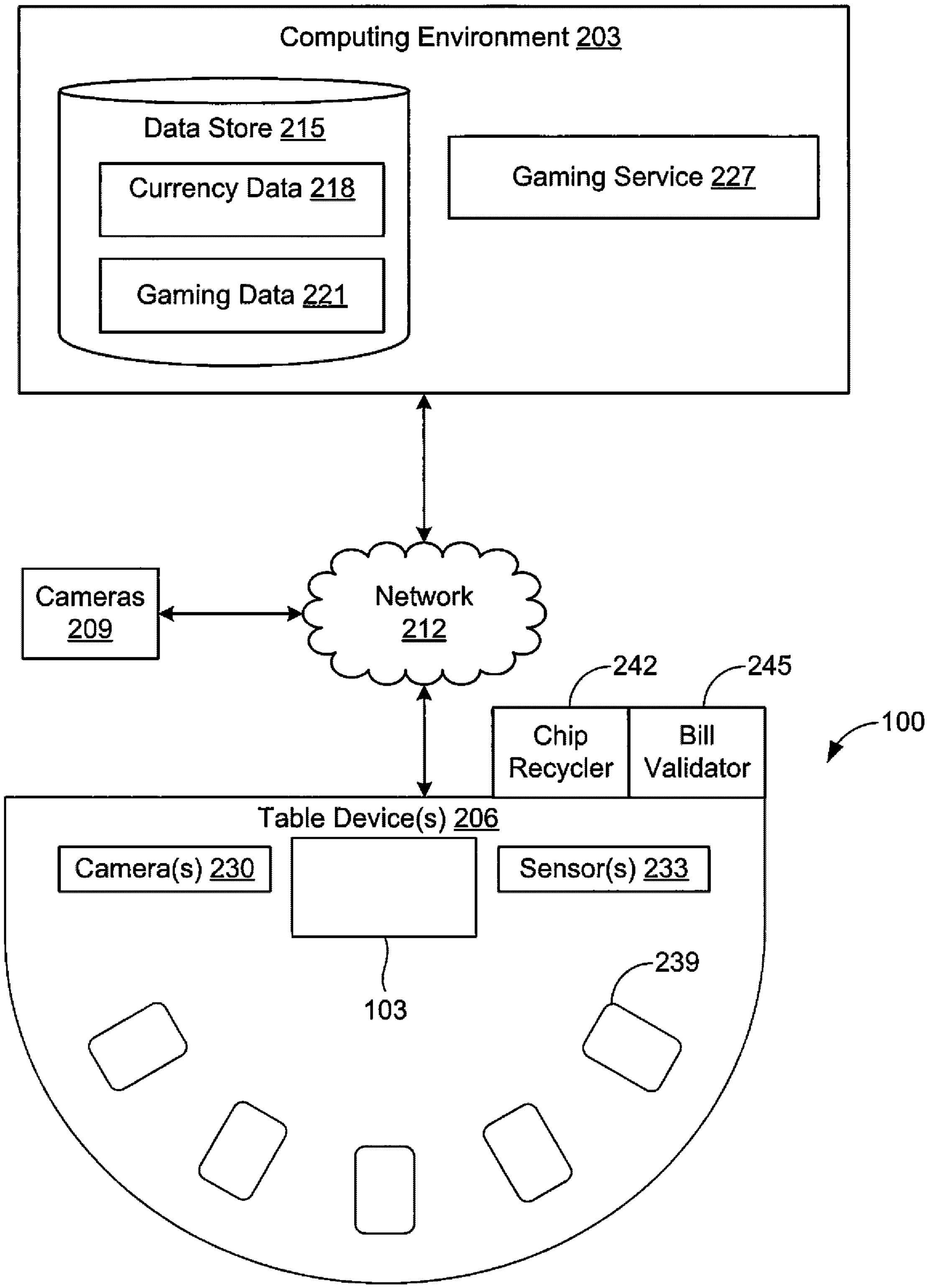
FIG. 2 is a drawing of a networked environment according to various example embodiments.

With reference to FIG. 2, shown is a networked environment 103 according to various embodiments. The networked environment 103 includes a computing environment 203, one or more gaming table devices 206 positioned in one or more gaming tables 100, and one or more cameras 209, which are in data communication with each other via a network 212. The network 212 includes, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

The computing environment 203 can include, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a hosted computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 215 that is accessible to the computing environment 203. The data store 215 may be representative of a plurality of data stores 215 as can be appreciated. The data stored in the data store 215, for example, is associated with the operation of the various applications and/or functional entities described below. The data store 215 can include currency data 218 and gaming data 221, among other data.

The components executed on the computing environment 203, for example, include a gaming service 227, and other applications, services, processes, systems, engines, or functionality not discussed in detail herein. The gaming service 227 is executed to recognize gaming chips used on one or more tables 206. As an example, a stack of gaming chips can be positioned in various locations on a gaming table 100 during a wagering game. One or more images can be captured of the gaming table 100 and the gaming service 227 can identify locate the one or more stacks of gaming chips in the images, count the gaming chips in each stack, and evaluate denominations for the gaming chips. It can be appreciated that some or all of the functionality as described with reference to the gaming service 227 can be executed in a gaming table device 206 including a computing device at the gaming table 100.

The currency data 218 can include a list of all active gaming chips including any identifiers associated with the gaming chips, such as, for example, RFID tag identifiers, barcode identifiers, visual characteristics including color information, and other identifiers. The gaming data 221 can store a history of sensor inputs received as well as any configuration, calibration, and control settings.

The gaming table 100 is representative of a plurality of gaming tables that may be coupled to the network 212. The gaming table device 206 can include, for example, one or more computing devices with a processor-based system such as a computer system. Such a computer system may be embodied in the form of an embedded computing device or other devices with like capability. The gaming table 100 can include one or more cameras 230, one or more sensors 233, a chip tray 103, one or more bet spots 239, a chip recycler 242, and a bill validator 245.

Similar to cameras 209, the cameras 230 can capture images of a surface of the gaming table 100. The gaming table device 206 or cameras 230 can send the images to the gaming service 227 via the network 212. The images can be sent to the gaming service 227 as a video stream of the surface of the gaming table 100. The gaming service 227 can receive images from various angles from cameras 209 and 230. The sensors 233 can include RFID antennas, video barcode scanners, weigh scales, and other sensors. The sensors 133 can be used to identify gaming chips played on a gaming table.

The gaming service 227 can validate RFID currency based on information read from sensors 233 that are RFID antennas. An RFID antenna can be positioned at the chip tray 103, at each of the bet spots 239, at the chip recycler 242, and in another positions. The gaming table device 206 can read RFID tags from RFID-enabled gaming chips using the RFID antennas. The information from the RFID tags can be stored along with data related to RFID antenna read the RFID tag. For example, an identifier from one or more RFID-enabled gaming chip can be read by an RFID antenna at a particular bet spot 239.

Figure 3:
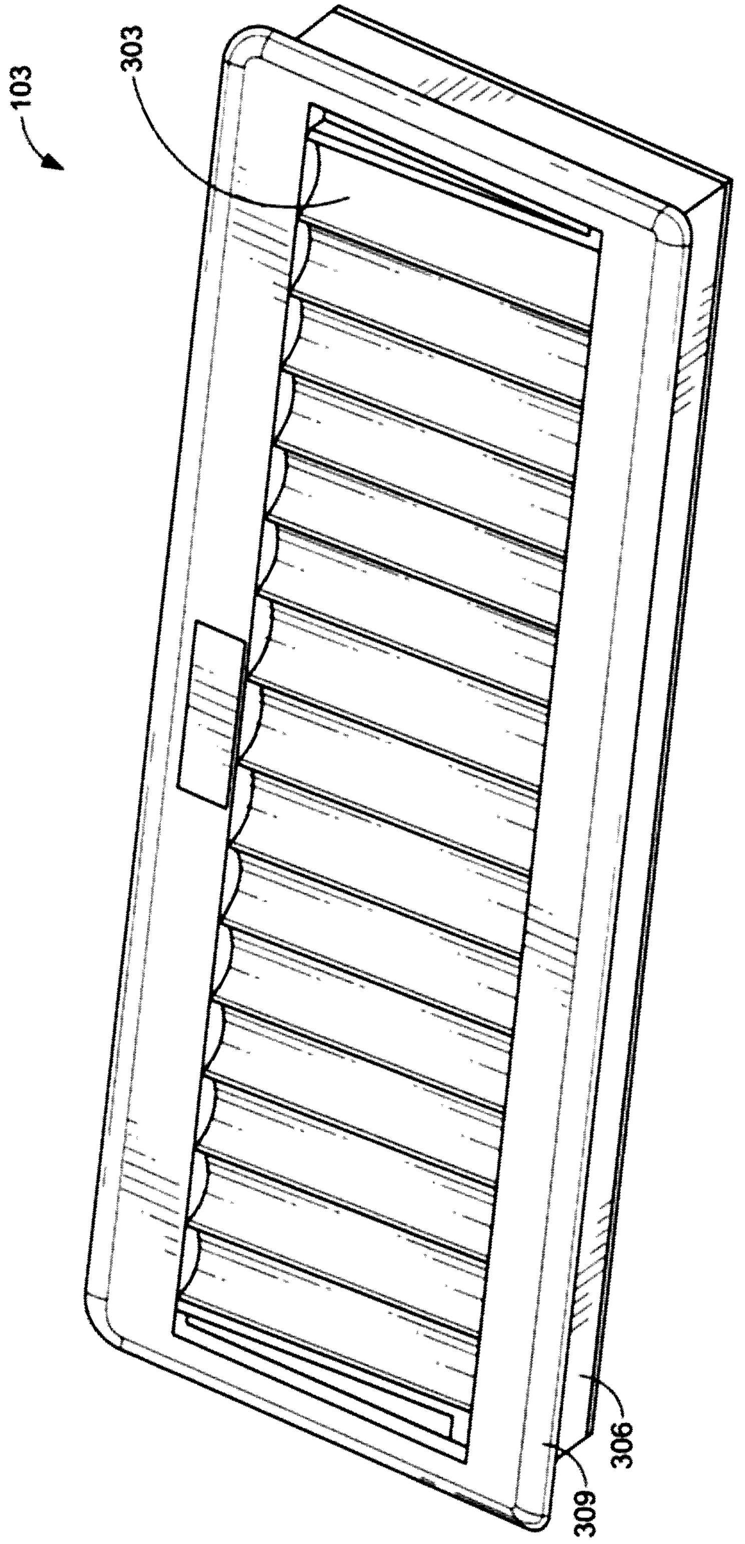
FIG. 3 is a chip tray according to various example embodiments.

With reference to FIG. 3, shown is a chip tray 103 according to various embodiments of the present disclosure. The chip tray 103 can include a storage rack to store gaming chips. The chip tray 103 can be placed in a gaming table to keep casino gaming chips secure. The chip tray 103 can be used by an employee, such as a dealer or manager.

The gaming chips can have different shapes and sizes for different reasons. As an example, a size and shape of gaming chips can vary based on denomination. A category of a population the gaming chips are targeted toward can influence the size and shape. For example, gaming chips targeted toward a mass market, very important persons (VIP), premium, or other categories can have varied sizes and shapes.

Casino operators can have a preference on the layout of a chip tray 103 used. The preference can depend on a variety of factors including on the casino history and on the area. Most casinos adapt or customize the chip tray 103 according to the wagering game and the currency needs of the precise location. With injection molded chip trays 103, if those customizations involve changing a layout of the storage area in the chip tray 103, a new injection mold may be necessary which can drastically increase the cost of production.

For a casino, it can be important to know a current amount and quantity of gaming chips in the chip tray 103 in order to manage the turnover of the gaming tables, the fills and credits at the gaming table, and the opening and closing of gaming tables, among other aspects. A casino operator can check the number of gaming chips visually. However, this can be impractical and time consuming. In other instances, the casino operator can use RFID chip trays when RFID enabled chips and plaques are utilized.

For chip trays 103, RFID equipped or not, the needed customization, which can involve the number of rows and the configuration of each row, can involve new designs and specific manufacturing tools like molds to accommodate the customized design. The customized configuration can involve defining the overall capacity of the chip tray, defining the diameter of the gaming chips being stored in the different rows, and defining the shape of the gaming chips, among other configurations. The shape of the gaming chip can be rectangular if a casino operator wants to store rectangular plaques that may be larger.

Casino operators may store higher denominations in the middle rows of the chip tray 103 and the smaller denominations in the external rows of the chip tray 103. The gaming chips with higher denominations can have larger diameters, such as 45 millimeters (mm) or 48 mm. The gaming chips with lower denominations can have smaller diameter, such as 39 mm or 40 mm. The variance in diameters can be helpful to differentiate the gaming chips when the gaming chips are stack together to prevent mistakes.

A changeable configuration of chip tube components 106 can be used in order to facilitate the customization of the chip trays 103. The chip tube component system can reduce the design and tooling costs and also to offer a solution to change the configuration of a tray on a group of tables easily and in a short time. The chip tray 103 is developed to be scalable and modular. In some embodiments, the chip tray 103 is RFID compatible.

The chip tray 103 can have a fixed width. A fixed sized of enclosure can also be used. In some embodiments, a set of fixed widths and fixed sized enclosures can be used to enable larger and smaller chip trays 103 based on preference. The chip tray 103 can be assembled with chip tube components 106 which can include tubes 303. Each of the tubes 303 can be configured to hold a specific shape and size of gaming chip, which can include, for example, round, rectangular, or other shape of gaming chip.

The chip tray 103 can include a base structure 306 to provide support for the chip tube components 106 and a trim cover 309. In some embodiments, the trim cover 309 can be detachably coupled to the base structure 306 to affix the chip tube components 106 in place. As an example, tabs on the trim cover 309 can click into slots on the base structure 306 to hold the trim cover 309 in place. The trim cover 309 can cover an outer edge of the chip tube components 106 to hold the chip tube components 106 in place.

The chip tube components 106 can have one or more tubes 303, with each tube 303 being referred to as a gaming chip storage row. The casino operator can assemble the chip tube components 106 to fill in the available space. The chip tray can be customized based on the current needs of the casino. In some embodiments, the weight of gaming chips can be used to secure the chip tube components 106 in place. An edge of the chip tube components 106 can be coupled together to secure the chip tube components 106 in place. In some embodiments, the edges of adjacent chip tube components 106 can be locked together based on a shape of the edges.

In one example embodiment, the chip tube components 106 each have two to three gaming chip storage rows 303, and the chip tray 100 can have a total of twelve to sixteen gaming chip storage rows 303 by assembling more than one chip tube component 106. The gaming chip storage rows can be configured to hold round gaming chips of 35 mm, 40 mm, 41 mm, 45 mm, or another diameter size. The gaming chip storage rows can be configured to hold rectangular gaming chips of 85 mm or other sizes. Different gaming tables 100 on a casino floor can each have different configurations of chip tube components 106 on a respective chip tray 103. Further, the chip tray 103 for each gaming table 100 can be quickly and easily changed to accommodate different chip tube components 106.

Figure 4:
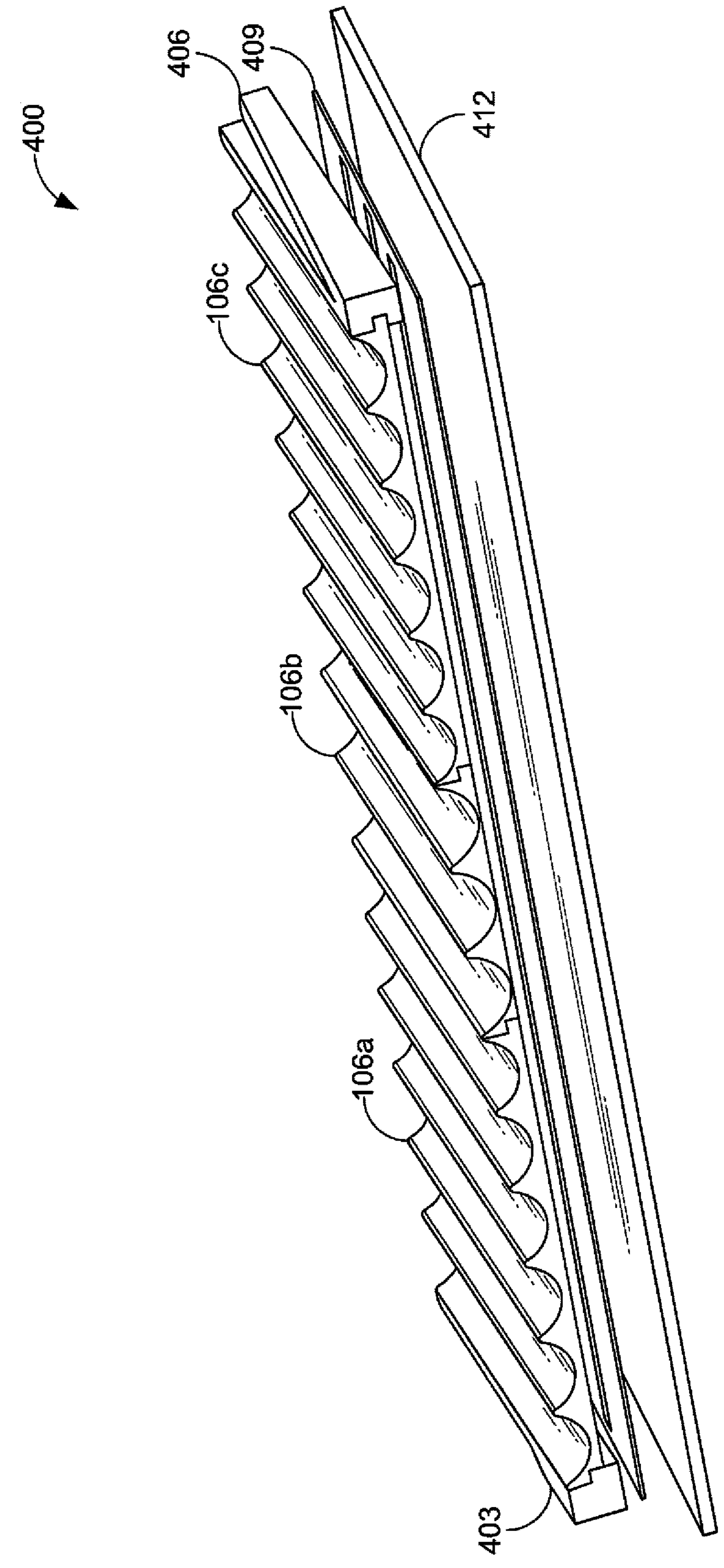
FIG. 4 illustrates an exploded view of components of a chip tray according to various embodiments of the present disclosure.

With reference to FIG. 4, shown is an exploded view of select components 400 of an example chip tray 103 according to various embodiments of the present disclosure. The components 400 include chip tub components 106*a*, 106*b*, and 106*c*, spacer components 403 and 406, RFID antenna 409, a base 412, and potentially other components.

The chip tube components 106*a-c* can be assembled together to span the fixed width of the chip tray 103. The spacer components 403 and 406 can be used to fill in any remaining space to span the entire fixed width. The width of each chip tube component 106 can be based on a size of gaming chips to be stored in each chip tube and a number of chip tubes. In various embodiments, because various chip tube components 106 of various fixed sizes are selectable, the span of the assembled chip tube components 106 may not be set precisely to fit within a fixed span of the chip tray 103. As such, a gap may exists between the sides of the chip tray 103 and chip tube components 106. The spacer components 403 and 406 can be coupled to the sides of the chip tube components 106 to facilitate a precise fit.

One or more RFID antenna 409 can be placed underneath the chip tube components 106. In some embodiments, the RFID antenna 409 is installed into the gaming table 100 below a base 412 of an enclosure for the chip tray 103. The RFID antenna 409 can be covered to protect the RFID antenna 409 from damage when the chip tray 103 is inserted into the gaming table 100. The RFID antenna 409 can be locked into the gaming table 100 for security reasons to prevent tampering.

The RFID antenna 409 can be configured to read gaming chips placed in the chip tube components 106 via the gaming service 227 (FIG. 2). A result of the read can be displayed to the dealer on a display to show a quantity and amount of gaming chips in the chip tray 103. The display can also include an authentication result to indicate whether all of the read gaming chips successfully authenticated or not. In some embodiments, the display can include one or more indicators on the table, such as, for example, LED indicators, that indicate a success or failure of a read or validation. In some embodiments, the chip tray 103 can include shielding when one or more RFID antennas are used.

Figure 5:
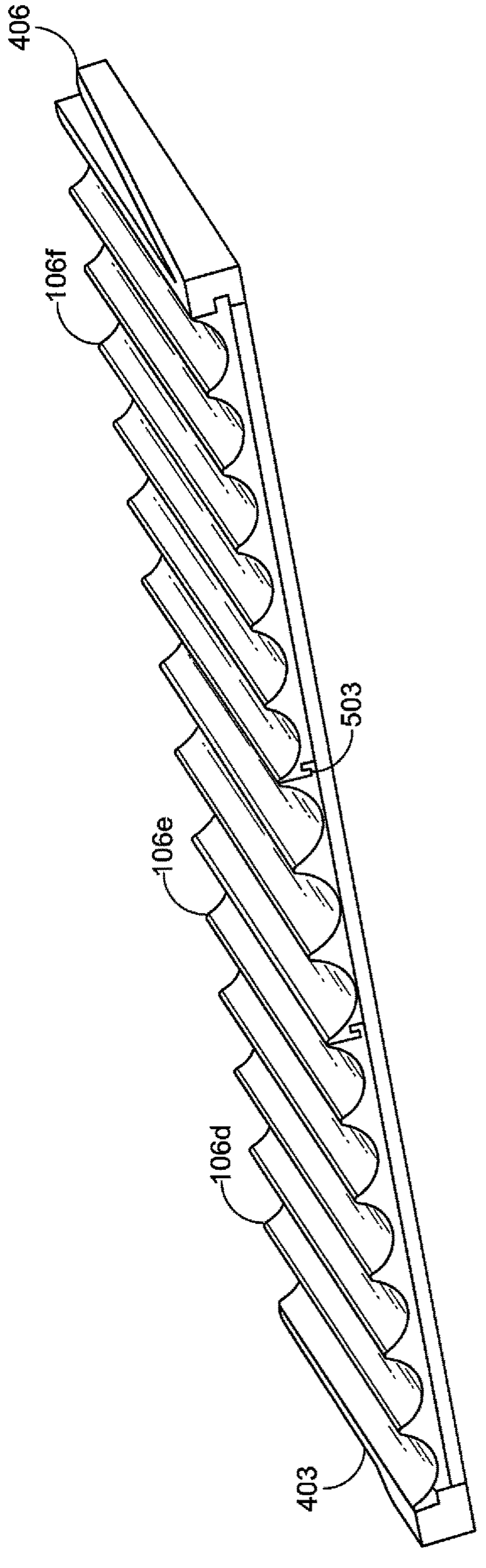
FIG. 5 illustrates an exploded view of components of a chip tray according to various embodiments of the present disclosure.

With reference to FIG. 5, shown is an exploded view of select components 500 of an example chip tray 103 according to various embodiments of the present disclosure. The components 500 include chip tub components 106*d*, 106*e*, and 106*f*, spacer components 403 and 406, and potentially other components. The chip tube components 106 can have a coupling edge on a first side and a second side opposite the first side. The coupling edges can be configured to mate against one another at a joint 503. In some embodiments, the coupling edges can prevent disconnecting adjacent chip tube components 106 unless the chip tube components 106 and slide in opposite directions along the coupling edge with respect to one another. Although the coupling edges shown correspond to a hooking mechanism, in other embodiments, other types of edge joints can be used such as a tongue and grove joint, finger joints, or other types of edge joints. As shown, the spacer components 403 and 406 can also include a coupling edge to edge join with the adjacent chip tube components 106.

Figure 6:
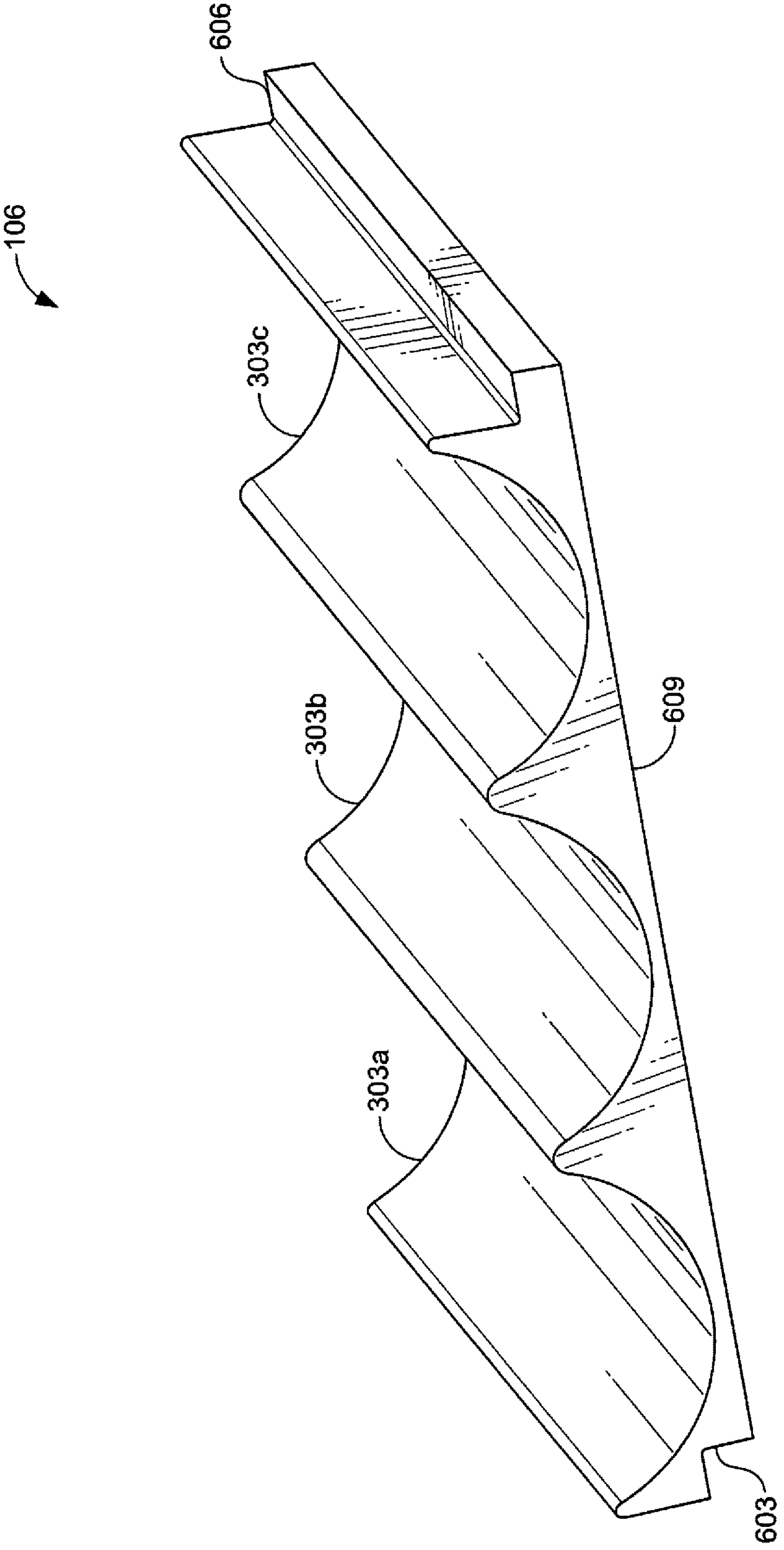
FIG. 6 illustrates a chip tube component according to various embodiments of the present disclosure.

With reference to FIG. 6, shown is an example chip tube component 106 according to various embodiments of the present disclosure. The chip tube component 106 can include one or more tubes 303*a*-303*c*. The chip tube component 106 can have a first coupling edge 603 and a second coupling edge 606 opposite the first coupling edge. In some embodiments, the front edge 609 and/or a back edge (not shown) can have a coupling edge to couple to a front and back spacer component, similar to spacer components 403 and 406.

The chip tube component 106 can be created using a 3D printer or any other manufacturing process for plastic and metal materials. As an example, material removal or machining can be used to form chip tube components 106. The chip tube components 106 can also be formed or injection molded.

A catalogue of chip tube components 106 can be provided to a casino operator to facilitate configuration of each chip tray 103. When RFID is being utilized, one or more RFID antennas and potentially a shielding plate can be placed underneath the chip tube components 106. The RFID antenna and shielding can be made to cover a complete width off the tray regardless of the configuration of the chip tube components 106.

Figure 7:
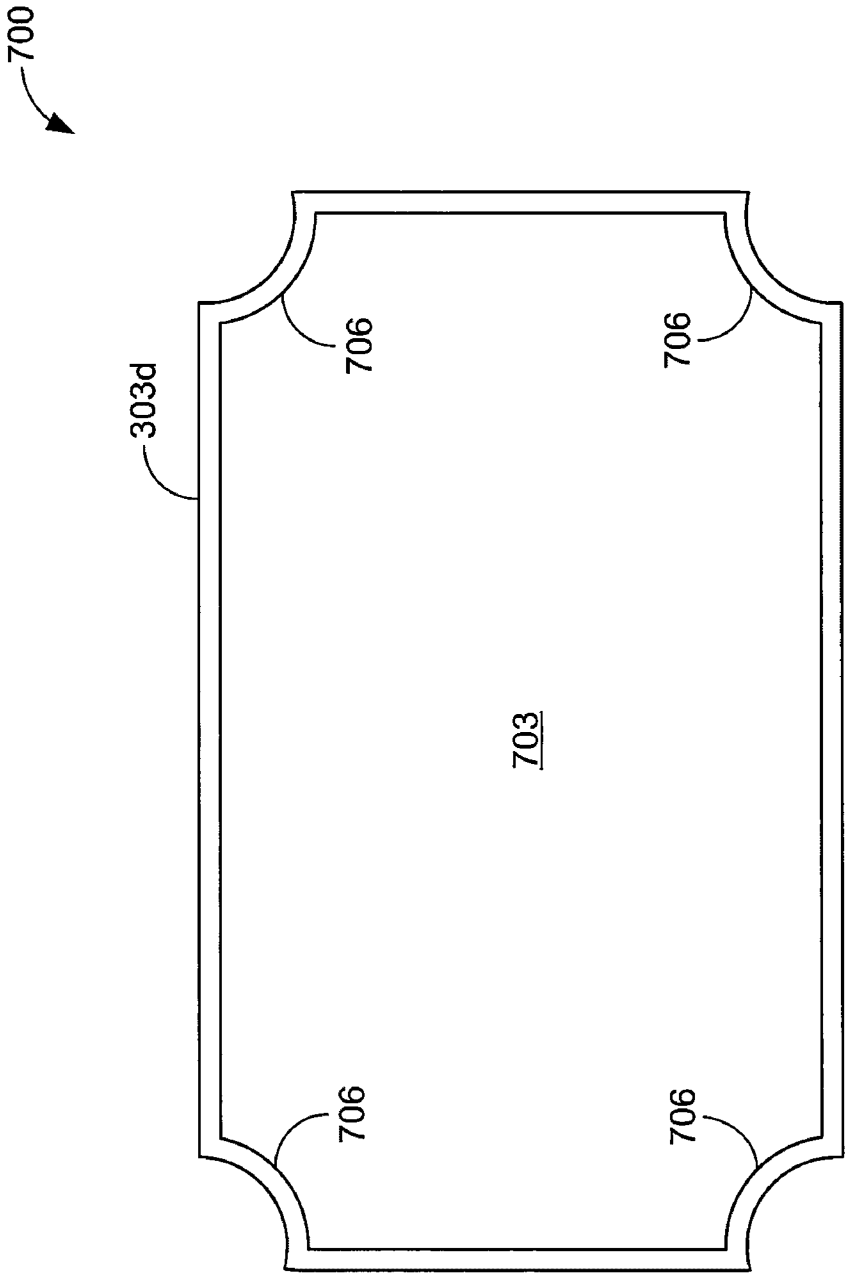
FIG. 7 illustrates a portion of a gaming chip storage row according to various embodiments of the present disclosure.

With reference to FIG. 7, shown is a top view of a portion 700 of an example gaming chip storage row 303*d* according to various embodiments of the present disclosure. A chip tube component 106 can include one or more gaming chip storage row 303*d*. The gaming chip storage row 303*d* can hold one or more rectangular plaque in a space 703. The edges 706 can provide horizontal support for the plaques while also providing space for fingers to reach in and grab plaques.

Figure 8:
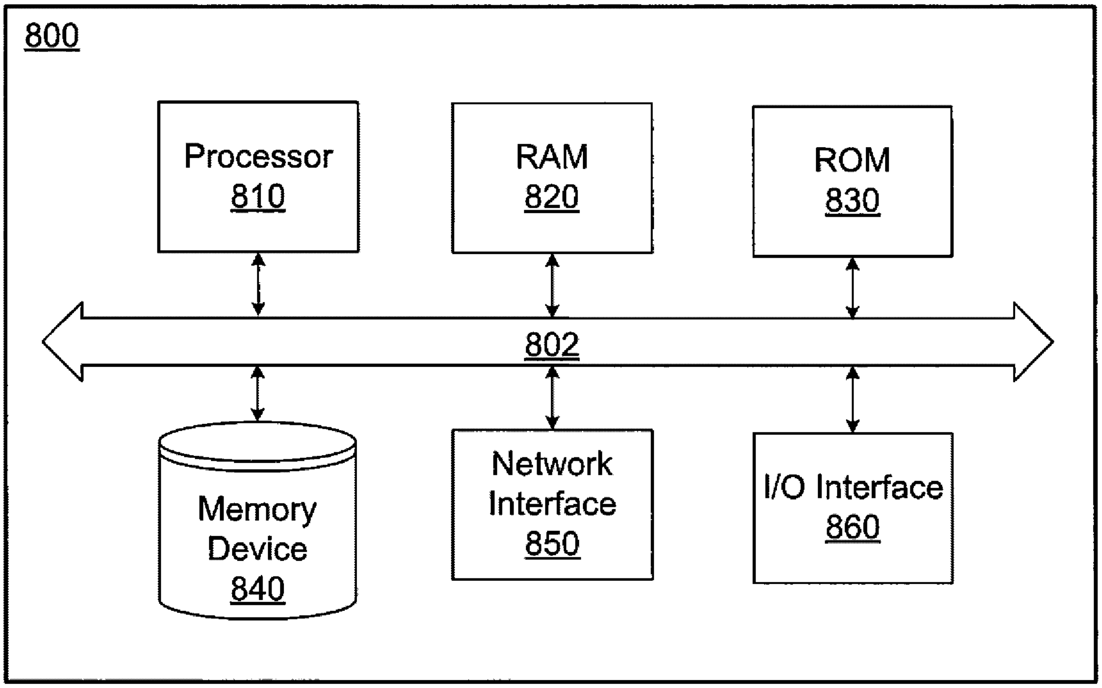
FIG. 8 is a schematic block diagram that illustrates an example computing device employed in the networked environment of FIG. 2 according to various embodiments.

Turning to FIG. 8, an example hardware diagram of a computing device 800 is illustrated. The gaming service 227 may be implemented, in part, using one or more elements of the computing device 800. The computing device 800 can include one or more of a processor 810, a Random Access Memory ("RAM") 820, a Read Only Memory ("ROM") 830, a memory device 840, a network interface 850, and an Input Output ("I/O") interface 860. The elements of the computing device 800 are communicatively coupled via a bus 802.

The processor 810 can include an arithmetic processor, Application Specific Integrated Circuit ("ASIC"), or other types of hardware or software processors. The RAM and ROM 820 and 830 can include a memory that stores computer-readable instructions to be executed by the processor 810. The memory device 830 stores computer-readable instructions thereon that, when executed by the processor 810, direct the processor 810 to execute various aspects of the present disclosure described herein. When the processor 810 includes an ASIC, the processes described herein may be executed by the ASIC according to an embedded circuitry design of the ASIC, by firmware of the ASIC, or both an embedded circuitry design and firmware of the ASIC. As a non-limiting example group, the memory device 830 comprises one or more of an optical disc, a magnetic disc, a semiconductor memory (i.e., a semiconductor, floating gate, or similar flash based memory), a magnetic tape memory, a removable memory, combinations thereof, or any other known memory means for storing computer-readable instructions. The network interface 850 can include hardware interfaces to communicate over data networks. The I/O interface 860 can include device input and output interfaces such as keyboard, pointing device, display, communication, and other interfaces. The bus 802 can electrically and communicatively couple the processor 810, the RAM 820, the ROM 830, the memory device 840, the network interface 850, and the I/O interface 860, so that data and instructions may be communicated among them.

In operation, the processor 810 is configured to retrieve computer-readable instructions stored on the memory device 840, the RAM 820, the ROM 830, or another storage means, and copy the computer-readable instructions to the RAM 820 or the ROM 830 for execution, for example. The processor 810 is further configured to execute the computer-readable instructions to implement various aspects and features of the present disclosure. For example, the processor 810 may be adapted and configured to execute the processes described above with reference to FIG. 2, including the processes described as being performed by the gaming service 227. Also, the memory device 840 may store the data stored in the database 215.

Figure 9:
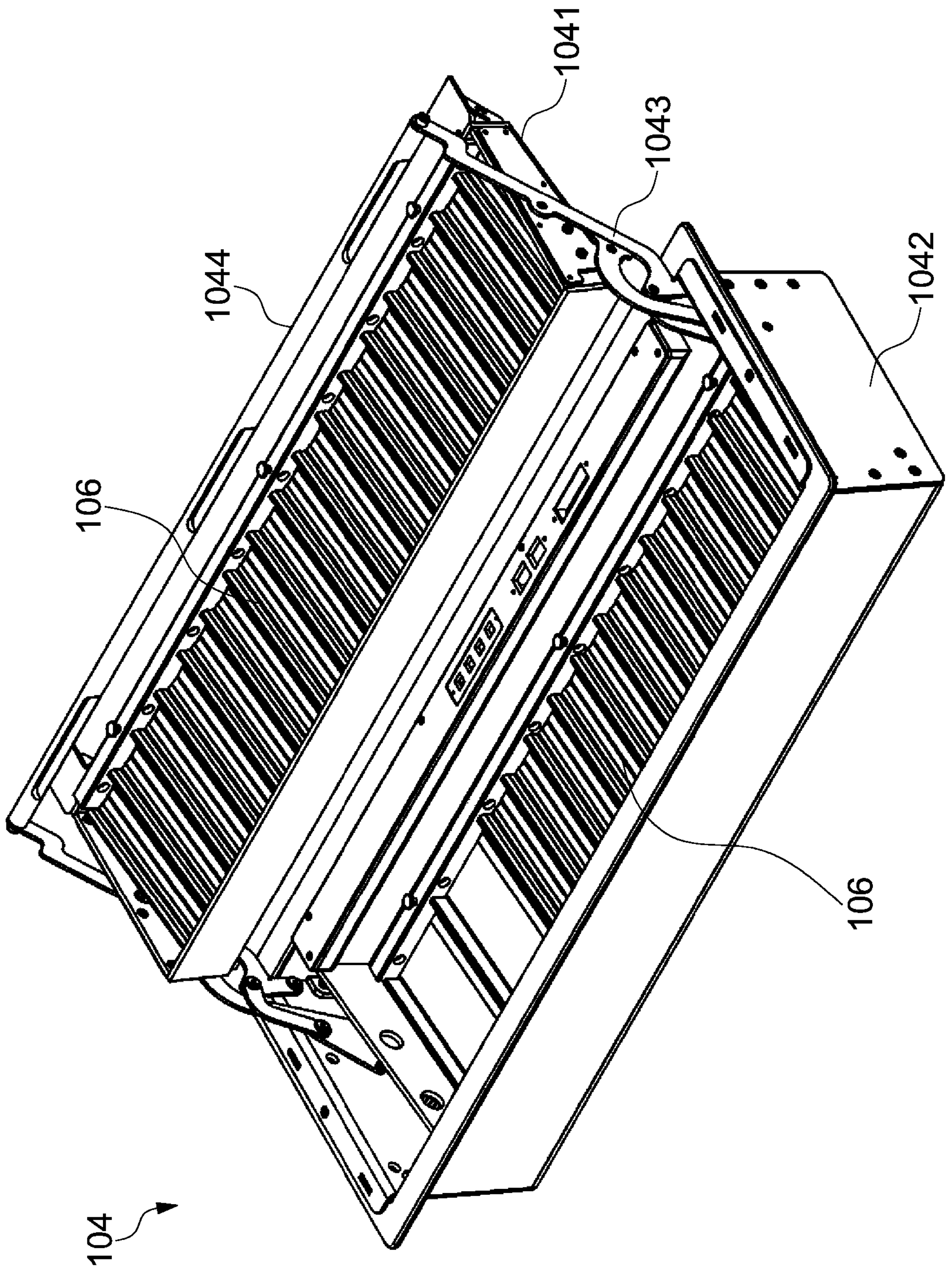
FIG. 9 is a perspective view of a chip tray according to a second embodiment.
Figure 10:
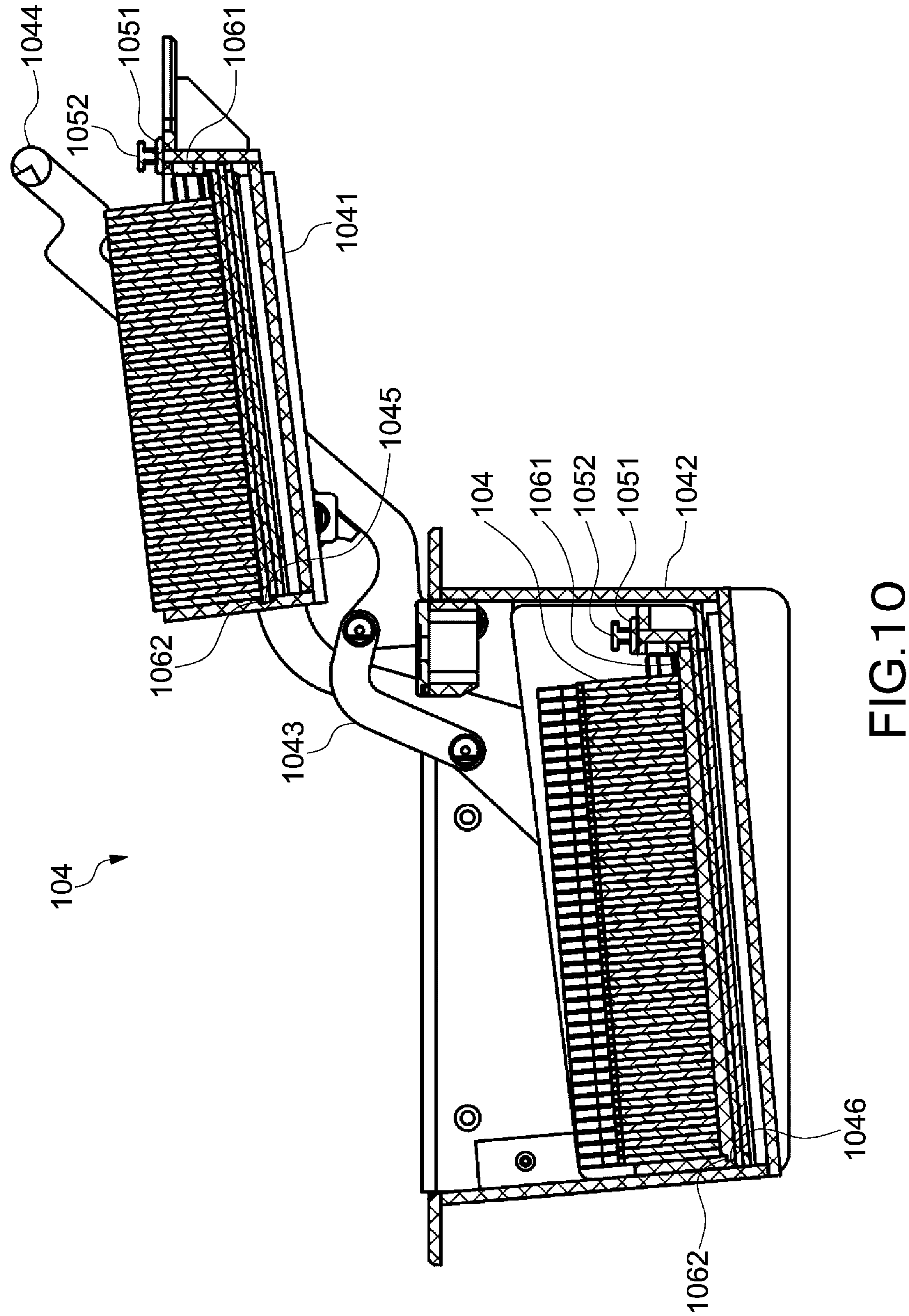
FIG. 10 is a cross sectional view of a chip tray 104 according to the second embodiment in a state where the lower tray is opened.
Figure 11:
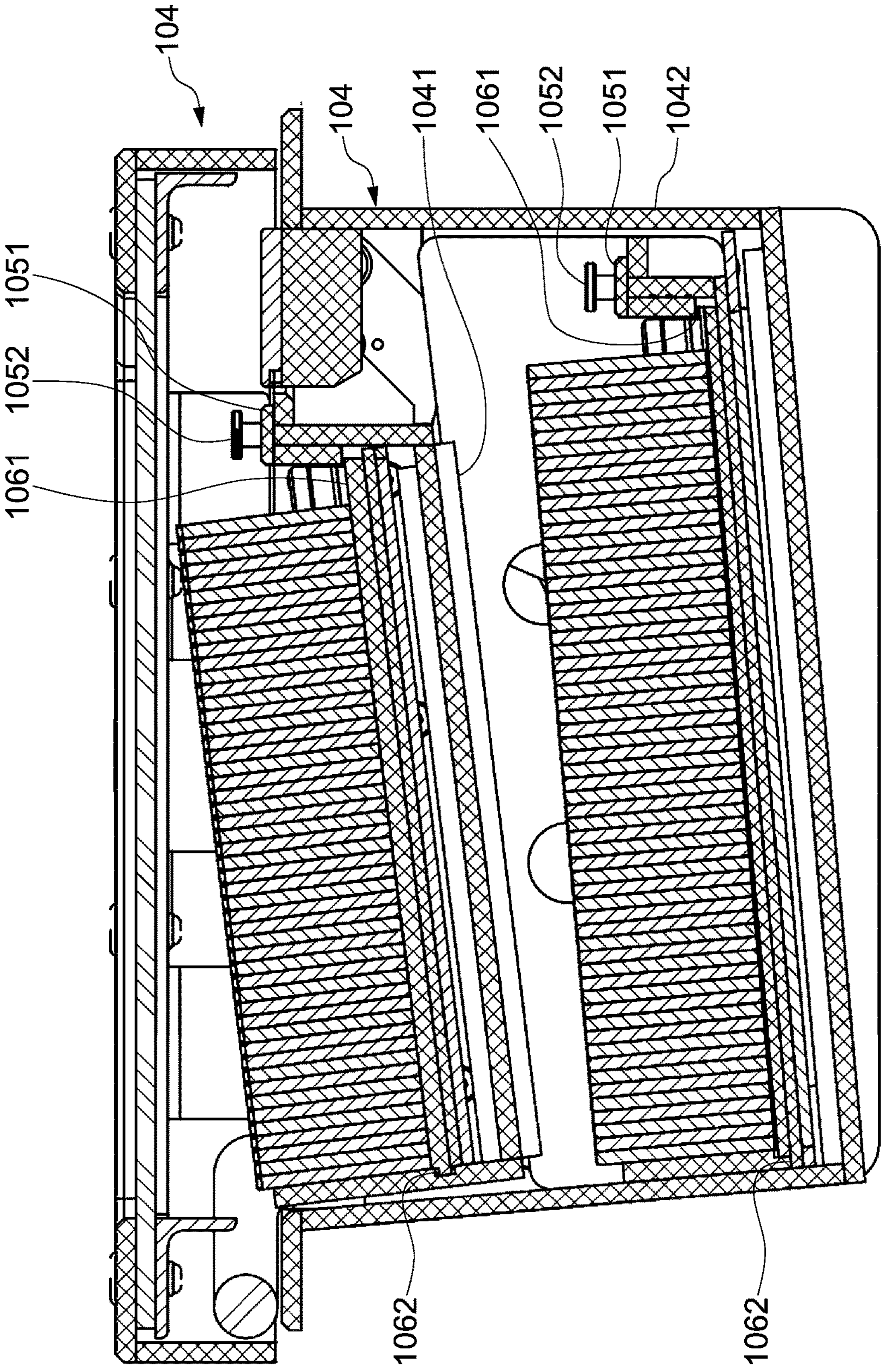
FIG. 11 is a cross sectional view of the chip tray according to the second embodiment in a state where an upper tray is contained in a lower tray.

FIG. 9 is a perspective view of a chip tray 104 according to a second embodiment. The chip tray 104 is a dual chip tray constructed by an upper tray 1041 and a lower tray 1042. FIG. 10 is a cross sectional view of the chip tray 104 in a state where the lower tray 1042 is opened, and FIG. 11 is a cross sectional view of the chip tray 104 in a state where the upper tray 1041 is contained in the lower tray 1042.

The lower stage chip tray 1042 has a rectangular parallelepiped shape which is opened in its upper surface, and chip tube components 106 are arranged side by side in a bottom surface of an internal portion thereof. The upper stage chip tray 1041 has a tray shape, and the chip tube components 106 are arranged side by side in a bottom surface of an internal portion thereof. The upper tray 1041 can be stored in the lower tray 1042 from the above of the chips stored in the lower tray 1042.

The upper tray 1041 is movably connected to the lower tray 1042 via a link mechanism 1043. By lifting up a handle 1044, the upper tray 1041 can be moved upward diagonally from the lower tray 1042 while keeping a posture of the upper tray 1041, thereby making an upper surface of the lower tray 1042 open.

Although an illustration is omitted, a bottom surface of the upper tray 1041 is provided with an RFID antenna for reading an RFID tag which is embedded in the gaming chip stored in the upper tray 1041, and a bottom surface of the lower tray 1042 is also provided with an RFID antenna for reading an RFID tag which is embedded in the gaming chip stored in the lower tray 1042. A shield blocking an electromagnetic wave from the RFID antenna or a jamming antenna generating an electromagnetic wave for partly cancelling or weakening the electromagnetic wave from the RFID antenna may be used so as to prevent the RFID antenna of the upper tray 1041 from reading the RFID tag of the gaming chip stored in the lower tray 1042, or prevent the RFID antenna of the lower tray 1042 from reading the RFID tag of the gaming chip stored in the upper tray 1041.

Figure 12:
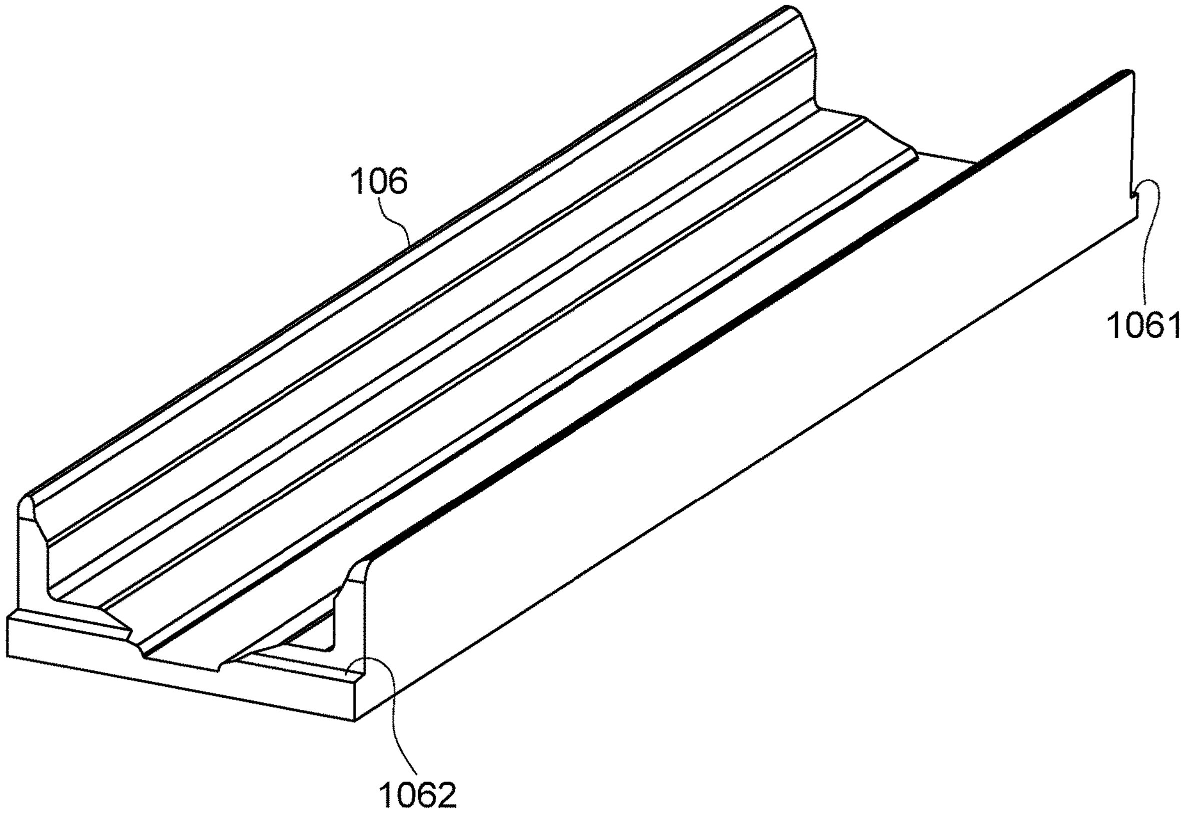
FIG. 12 is a perspective view of a chip tube component (for a small circular chip) according to the second embodiment.
Figure 13:
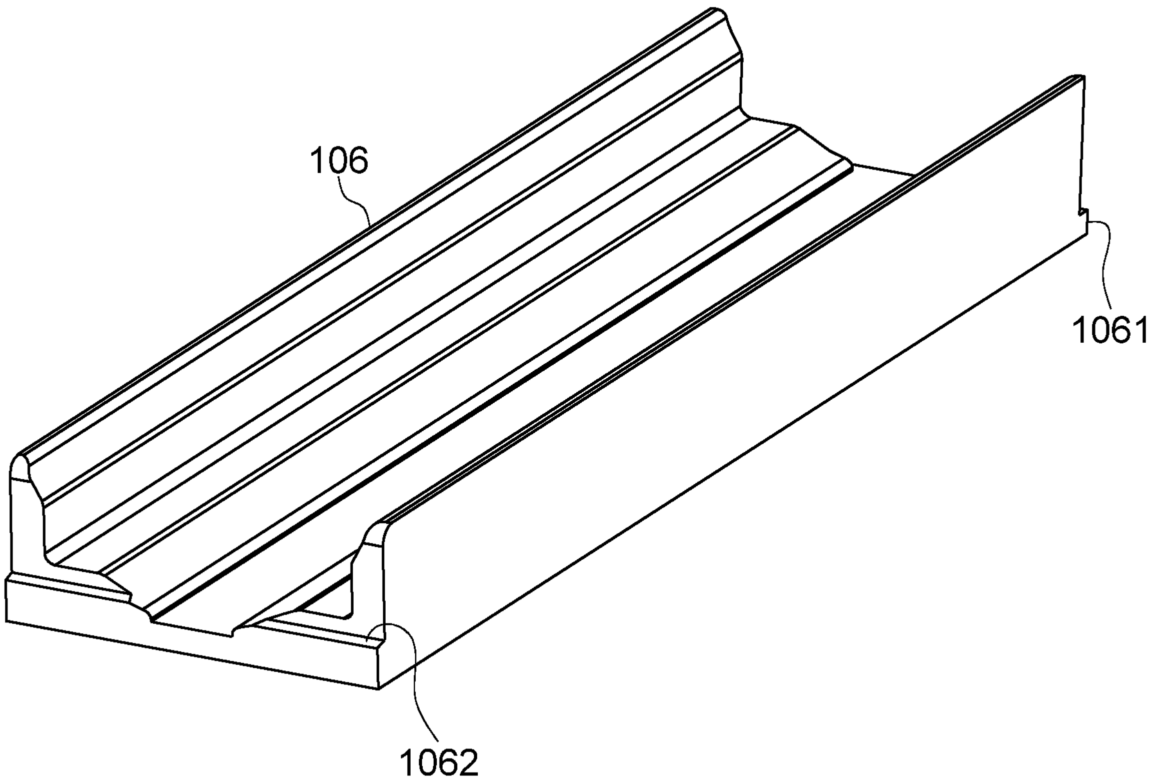
FIG. 13 is a perspective view of a chip tube component (for a large circular chip) according to the second embodiment.
Figure 14:
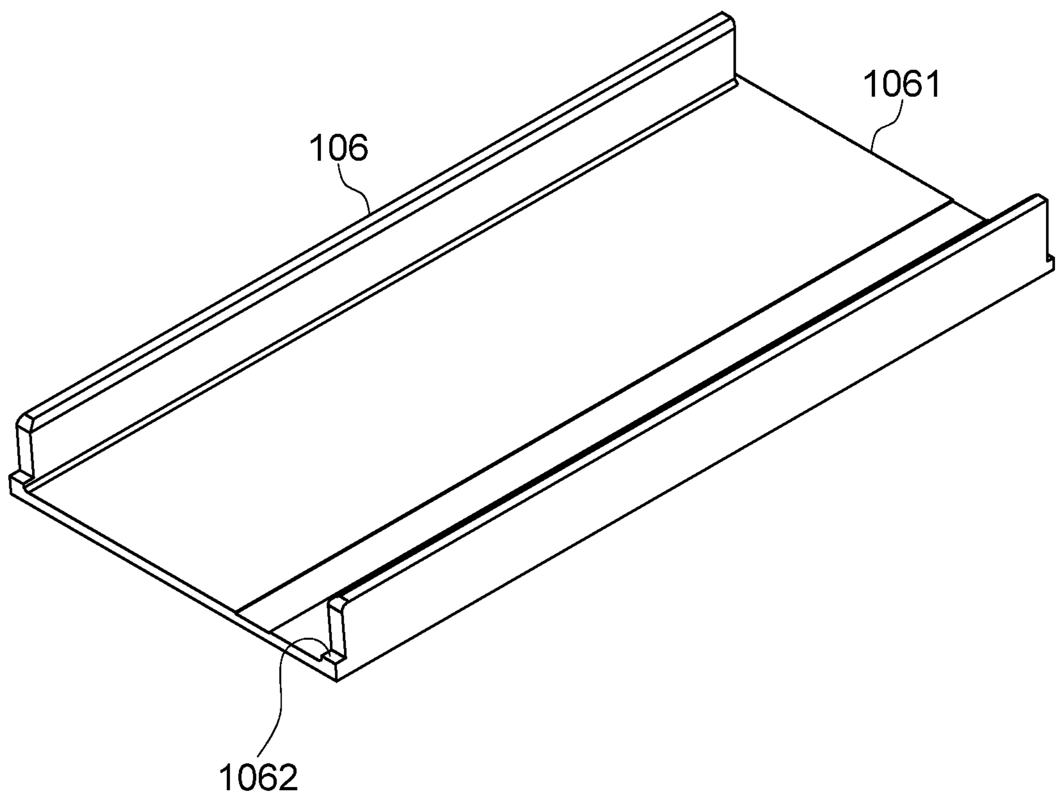
FIG. 14 is a perspective view of a chip tube component (for a plaque) according to the second embodiment.

FIG. 12 is a perspective view of a chip tube component (for small circular chips) according to the present embodiment, FIG. 13 is a perspective view of a chip tube component (for large circular chips) according to the present embodiment, and FIG. 14 is a perspective view of a chip tube component (for plaques) according to the present embodiment. Each of the chip tube components is constructed by a single gaming chip storage row. The chip tube components 106 for the small circular chip, for the large circular chip and for the plaque are respectively different in their widths in correspondence to sizes of the gaming chips to be stored therein.

A side surface of each of the chip tube components 106 is a flat surface, the surfaces are in contact with each other when the chip tube components 106 are coupled, and a gap is not formed between the side surfaces. As mentioned above, since the chip tube components 106 do not have a structure in which the adjacent chip tube components 106 lap over each other in the coupled portion vertically when the adjacent chip tube components 106 are coupled to each other at right edges and left edges, the respective chip tube components 106 can be independently attached to and detached from the upper tray 1041 or the lower tray 1042 separately from the other chip tube components 106 by detaching a securing L-shaped angle 1051 mentioned later.

In each of the upper tray 1041 and the lower tray 1042, the chip tube component 106 is arranged in a slightly inclined manner so that a front end comes to an upper side and a rear end comes to a lower side. Further, the chip tube component 106 for the upper tray 1041 is formed to be shorter in a longitudinal direction than the chip tube component for the lower tray 1042.

Holding flanges 1061 and 1062 are formed respectively at the front end and the rear end of the chip tube component 106 in the longitudinal direction. The flanges 1062 at the rear end are fitted to locking grooves 1045 and 1046 which are respectively formed in the upper tray 1041 and the lower tray 1042. The front end of the chip tube component 106 is secured to the upper tray 1041 and the upper tray 1042 by the securing L-shaped angle 105 holding the flange 1061 at the front end from the above. The securing L-shaped angle 1051 is secured to the upper tray 1041 and the lower tray 1042 respectively by screws 1052.

The front end and the rear end of the chip tube component 106 are opened. When the chip tube component 106 is installed in the upper tray 1041 or the lower tray 1042, the upper tray 1041 and the lower tray 1042 support the flat surface of the gaming chip in a direction of tilt.

Figure 15:
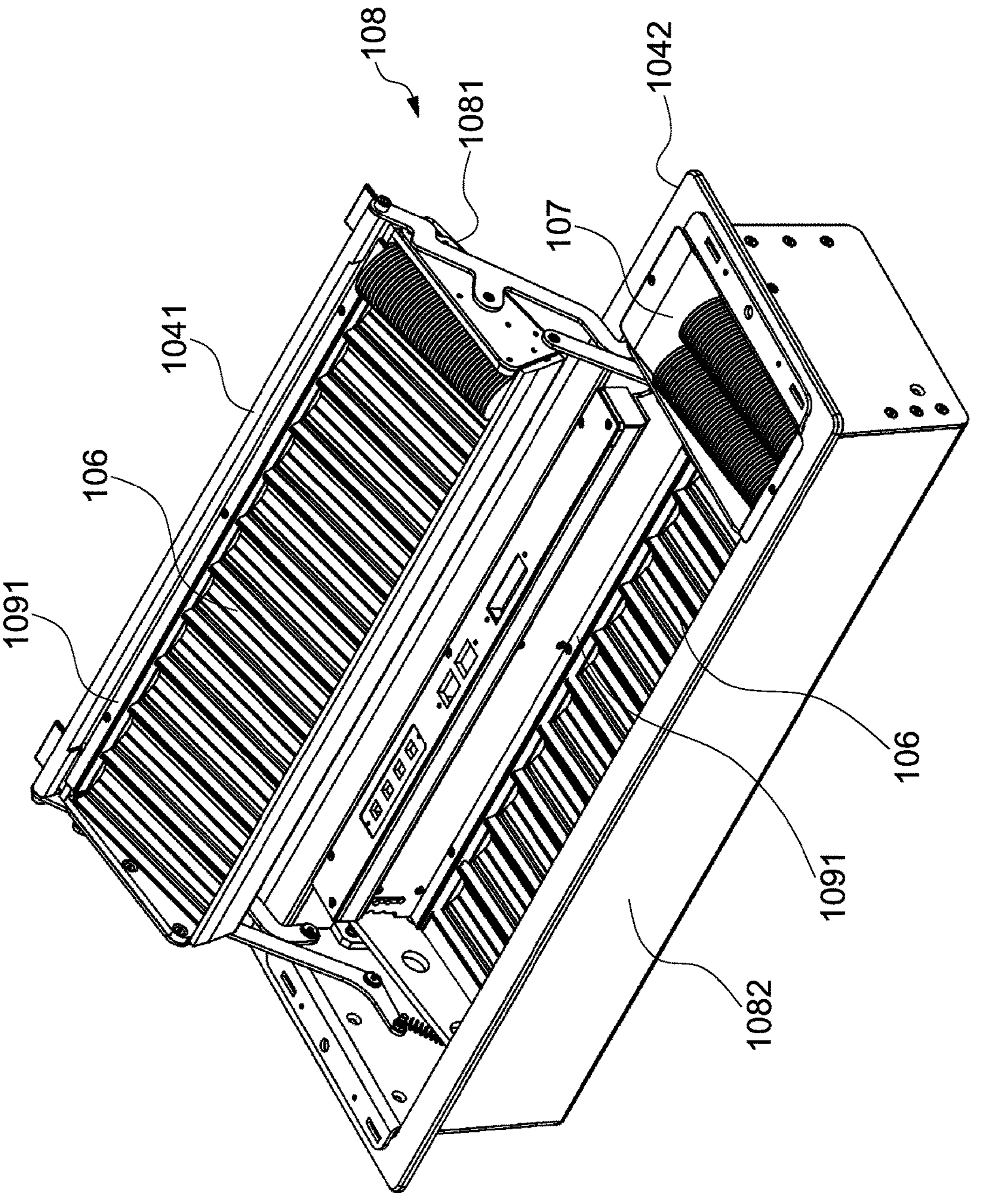
FIG. 15 is a perspective view of a chip tray according to a third embodiment.

FIG. 15 is a perspective view of a chip tray 108 according to a third embodiment. The chip tray 108 according to the present embodiment is also a dual chip tray including an upper tray 1081 and a lower tray 1082 in the same manner as the second embodiment. The chip tray 108 is further provided with a collected chip tube component 107. The collected chip tube component 107 is one kind of the chip tube component 106, and has a plurality of (two) tubes 303. The collected chip tube component 107 is a tray for temporarily reserving the chip collected from a player losing a game.

Figure 16:
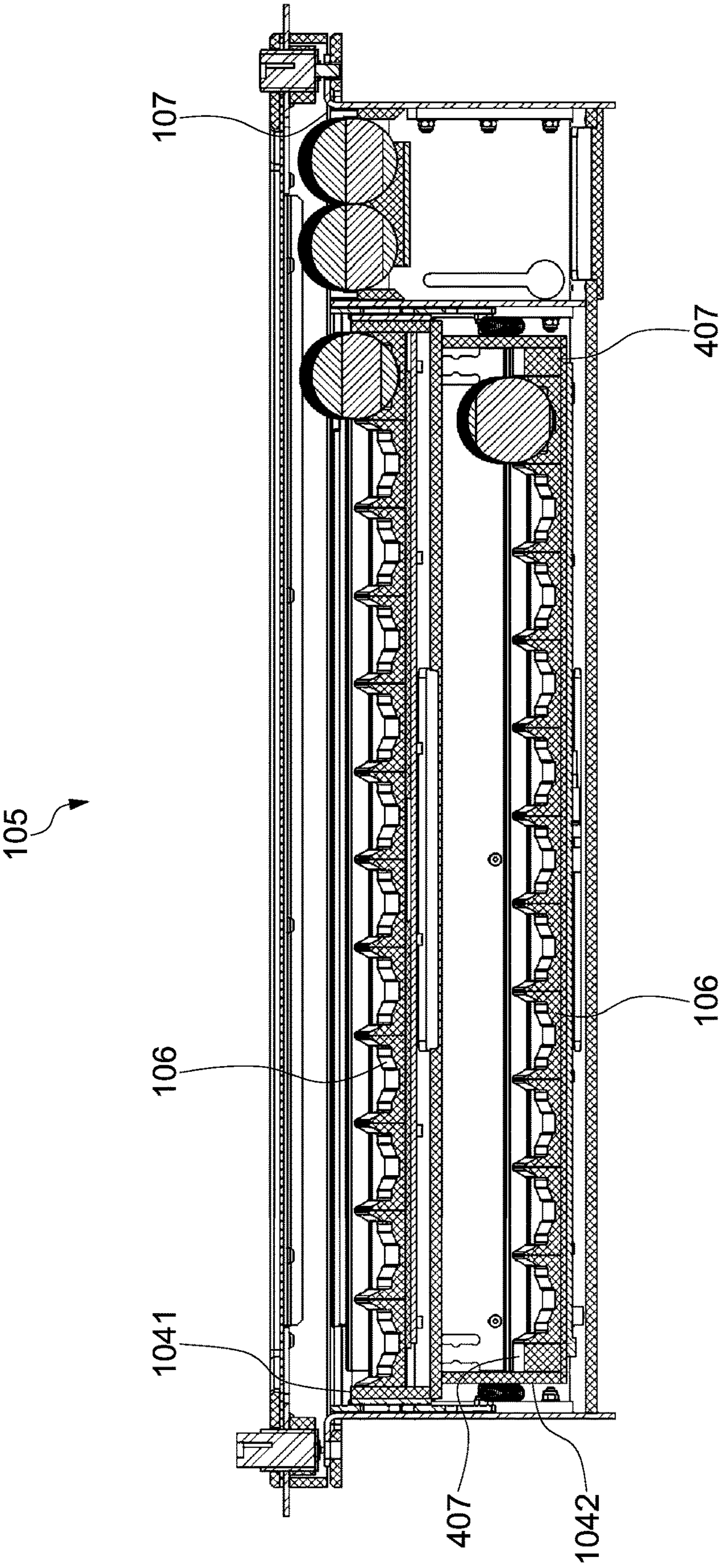
FIG. 16 is a cross sectional view of the chip tray according to the third embodiment.

FIG. 16 is a cross sectional view of the chip tray 108. As shown in FIG. 16, the collected chip tube component 107 is fitted to the lower tray 1082 so as to come level with the upper tray 1081 contained in the lower tray 1082. A space is provided below the collected chip tube component 107, and a camera (not shown) is arranged in the space.

As shown in FIG. 16, spacer components 407 are provided at both ends of the chip tube component 106 in the lower tray 1041 in an array direction. By using the spacer components 407, the chip tube components 106 for the circular gaming chips and the chip tube components 106 for the plaque which are different from each other in their widths can be arranged in the lower tray 1081 by being combined at optional numbers. In the upper tray 1081, by using the spacer components 407, the chip tube components 106 for the circular gaming chips and the chip tube components 106 for the plaques can be similarly used by being combined at optional numbers.

Figure 17:
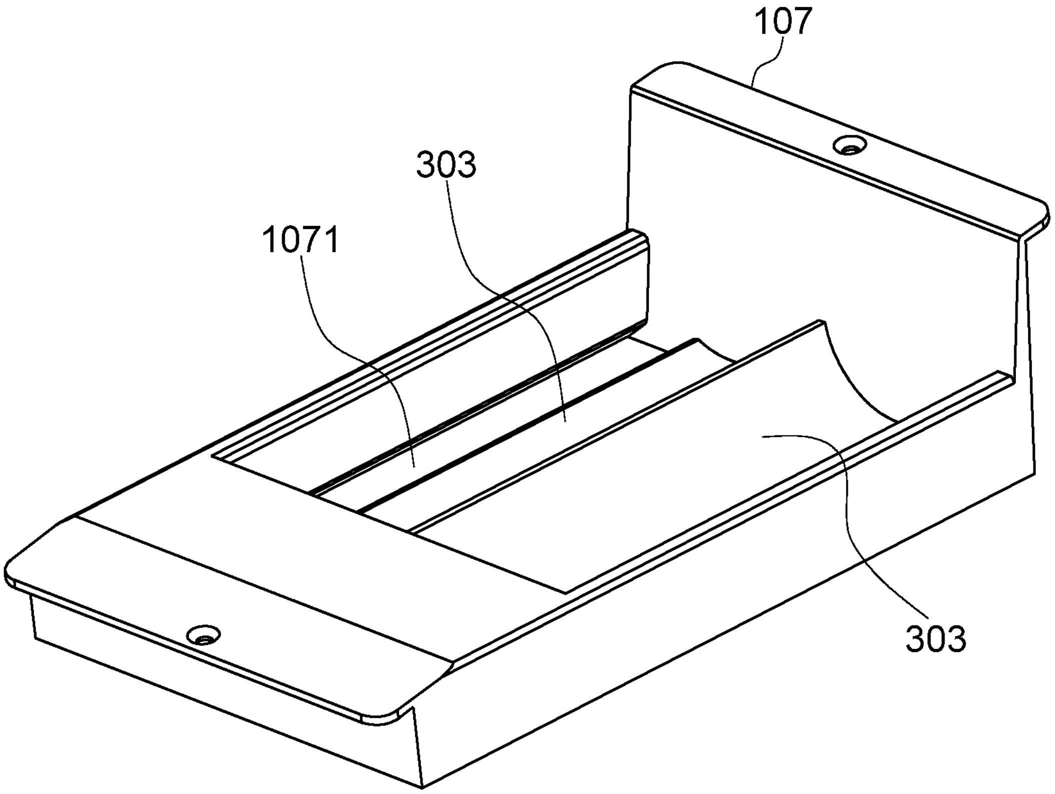
FIG. 17 is a perspective view of a collected chip tube component according to the third embodiment.
Figure 18:
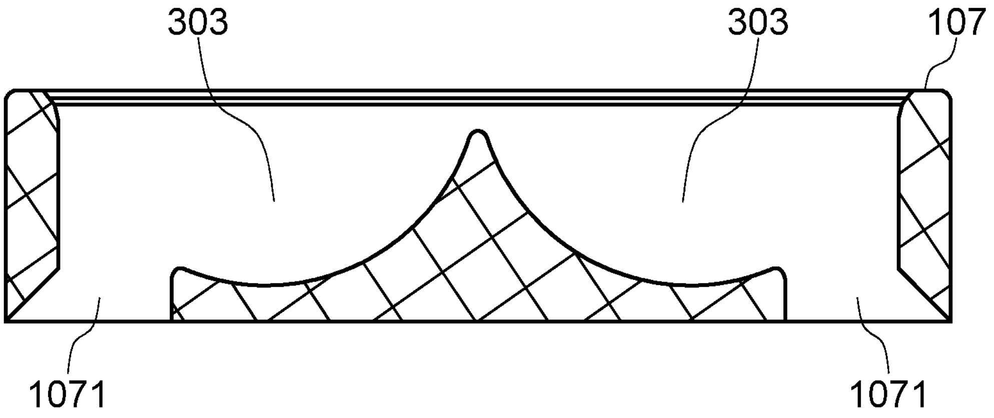
FIG. 18 is a cross sectional view of the collected chip tube component according to the third embodiment.

FIG. 17 is a perspective view of the collected chip tube component 107, and FIG. 18 is a cross sectional view of the collected chip tube component 107. A slit 1071 is formed in each of the tubes 303 of the collected chip tube component 107 in a tube longitudinal direction (that is, a stacking direction of the gaming chips). A camera arranged below the collected chip tube component 107 shoots a side surface of the gaming chip exposed from the slit 1071. A plurality of mirrors are installed between the camera and the slit 1071, and an illuminating light illuminating the slit 1071 is also provided. The plurality of mirrors conduct the reflected light from the slit 1071 illuminated by the illumination to a lens of the camera.

The gaming chip used in the present embodiment has a stripe pattern in a thickness direction on its side surface. The stripe pattern is formed by sandwiching a given color layer by common color layers. The given color is set per denomination (value) of the gaming chip. More specifically, a color of the given color layer expresses the denomination of the gaming chip. The common color is used in common for the chips having difference denominations. According to the structure mentioned above, when stacking the gaming chips, the given color layers for discriminating the denomination are not adjacent each other, and denomination of the gaming chips can be discriminated every one gaming chip.

A computing device 800 specifies the denomination in each of the gaming chips which are stored in the collected chip tube component 107, by making an image analysis to the shooting image of the camera. The RFID antenna may be provided in the collected chip tube component 107, and the RFID tags of the gaming chips stored in the collected chip tube component 107 may be read by the RFID antenna. At this time, the computing device 800 may make an inspection of the gaming chips stored in the collected chip tube component 107 by comparing the denomination acquired from the shooting image of the camera and the denomination acquired by reading the RFID tag.

Figure 19:
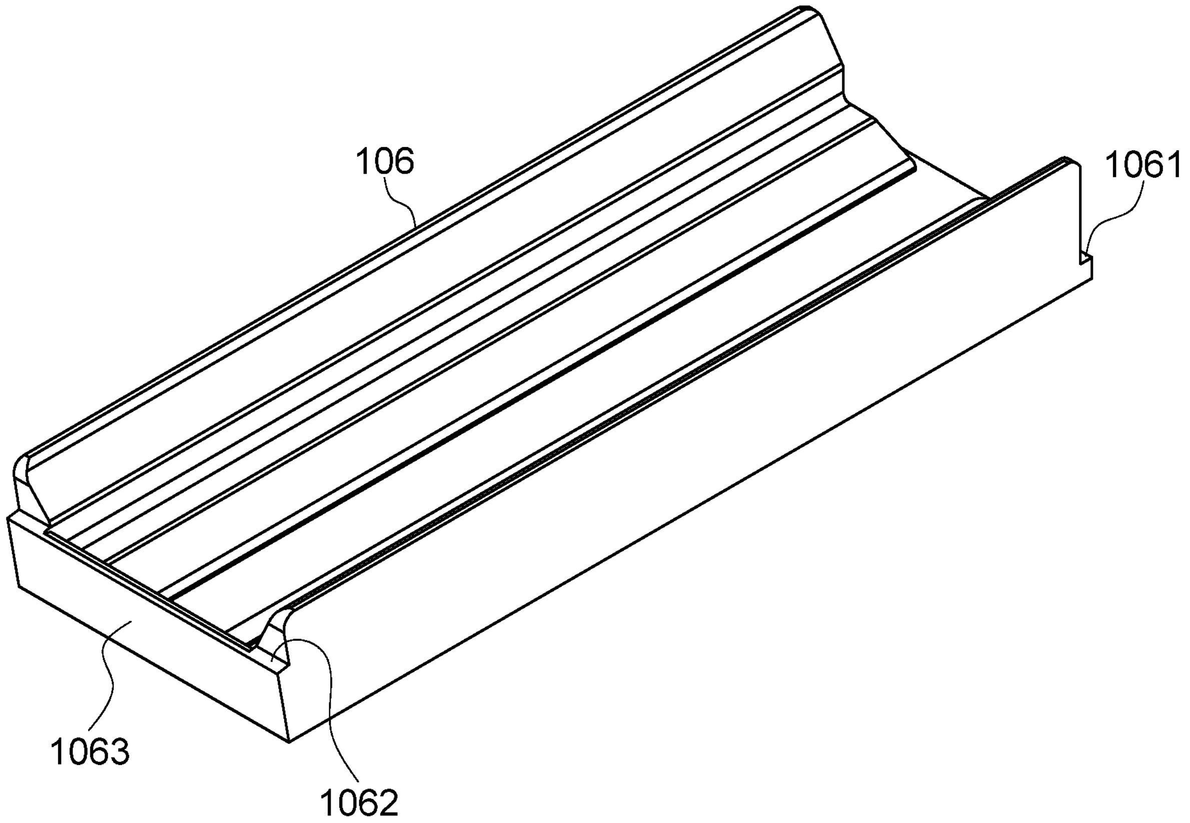
FIG. 19 is a perspective view of a chip tube component (for a gaming chip) according to the third embodiment.
Figure 20:
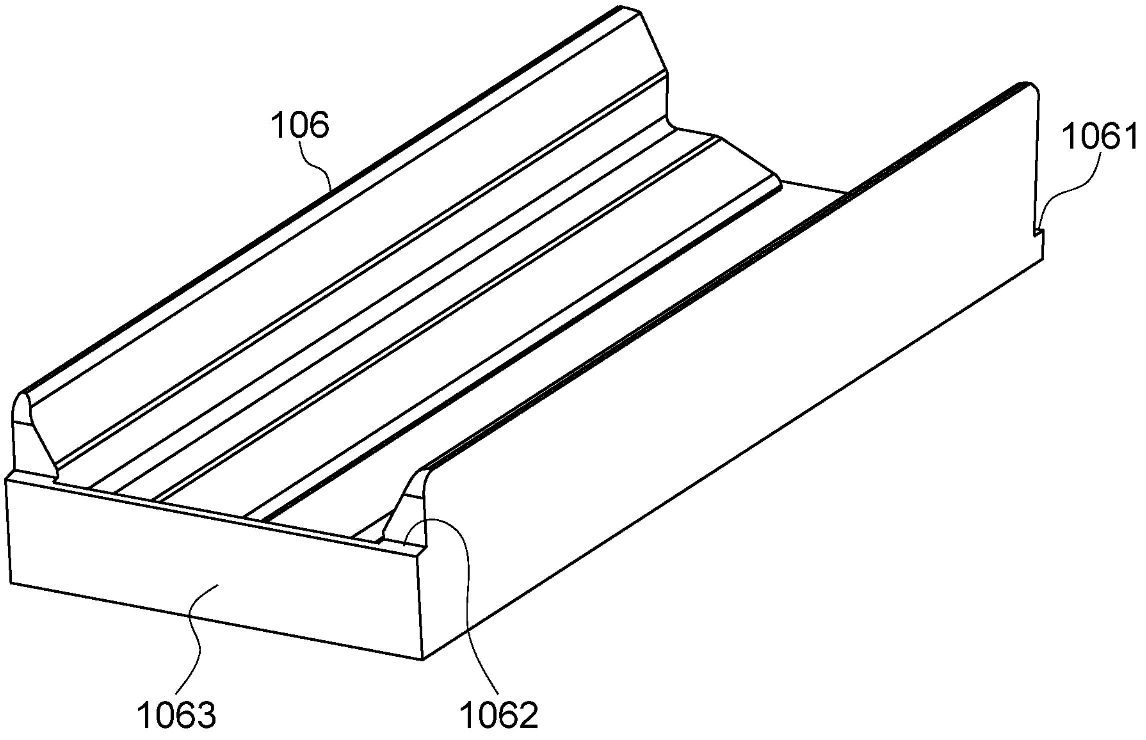
FIG. 20 is a perspective view of a chip tube component (for a plaque) according to the third embodiment.

FIG. 19 is a perspective view of a chip tube component (for circular gaming chips) according to the present embodiment, and FIG. 20 is a perspective view of a chip tube component (for plaques) according to the present embodiment. Each of the chip tube components is constructed by a single gaming chip storage row. The chip tube components 106 for the small circular chip and for the plaque are different in their widths in correspondence to the size of the gaming chip.

The chip tube component 106 according to the present embodiment is open in its front end, but has in its rear end a rear end wall 1063 which supports the gaming chip. As a result, the gaming chips can be stably retained in the chip tube component 106 even when the chip tube component

106 is detached from the upper tray 1081 or the lower tray 1082 while storing the gaming chips in the chip tube component 106.

Figure 21:
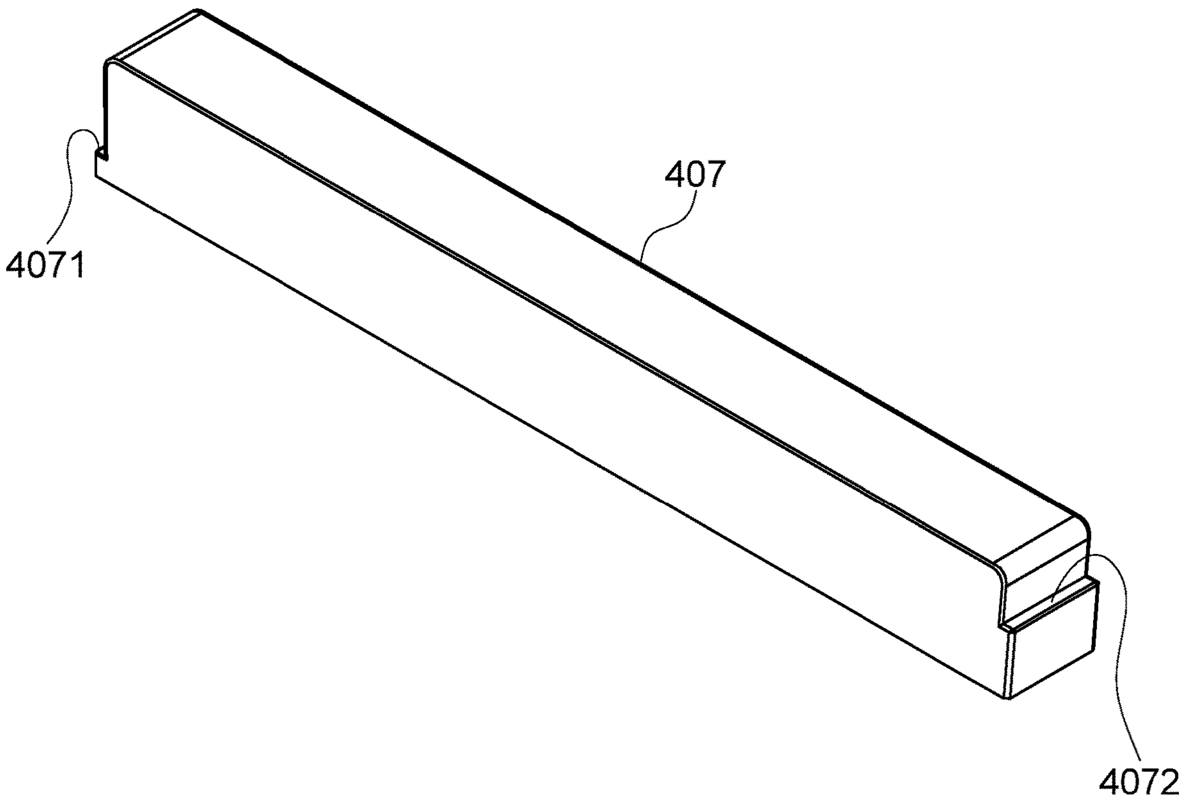
FIG. 21 is a perspective view of a spacer component according to the third embodiment.

FIG. 21 is a perspective view of a spacer component according to the present embodiment. Flanges 4071 and 4072 are formed at a front end and a rear end of the spacer component 407 in the same manner as the chip tube component 106. As a result, the spacer component 407 is also secured to the upper tray 1081 or the lower tray 1082 by an L-shaped angle 1081 (refer to FIG. 15) in the same manner as the chip tube component 106. An example of one spacer component 407 is illustrated in FIG. 20, however, plural kinds of spacer components 407 having different widths may be prepared and may be used in correspondence to the kind and the number of the used chip tube components 106.

The camera installed under the collected chip tube component 107 may be a visible light camera or an infrared camera used for detecting only the number of the gaming chips in the collected chip tube component 107.

In the case where recognition by a camera installed under the collection chip tube component 107 is unnecessary, the camera may be not installed, and the collected chips may be detected independently from the other chips in chip tube component 106 only by RFID.

In order to reduce the thickness of the chip tray, an RFID antenna may be provided only on the bottom surface of the upper tray 1041. In this case, the RFID antenna may read both the RFID tags embedded in the circular gaming chips or plaques stored in the upper tray 1041 and the RFID tags embedded in the circular gaming chips or plaques stored in the lower tray 1042. When the upper tray 1041 is contained in the lower tray 1042, all the RFID tags in the upper tray 1041 and the lower tray 1042 may be read by the single RFID antenna, and when the upper tray 1041 is out of the lower tray 1042, the RFID tags in the upper tray 1041 may be read by the single RFID antenna. In this case, it is preferable to design the lower tray 1042 so that the distance between the RFID tags in the gaming chips and the RFID antenna provided on the bottom surface of the upper tray 1042 is constant.

When the RFID antennas are respectively provided on the bottom surface of the upper tray 1041 and the bottom surface of the lower tray 1042, the upper antenna may read only the gaming chips in the upper tray 1041, and the lower antenna may read the gaming chips in the lower tray 1042 and a part or all of the gaming chips in the upper tray 1041, or the upper antenna may read a part or all of the gaming chips in the upper tray 1041, and the lower antenna may read only the gaming chips in the lower tray 1042. In any of these, it is possible to determine each of the gaming chips in the upper tray 1041 and the gaming chips in the lower tray 1042 by verifying a collective relationship of the reading results from the upper antenna and the lower antenna.

A phrase, such as "at least one of X, Y, or Z," unless specifically stated otherwise, is to be understood with the context as used in general to present that an item, term, etc., can be either X, Y, or Z, or any combination thereof (e.g., X, Y, and/or Z). Similarly, "at least one of X, Y, and Z," unless specifically stated otherwise, is to be understood to present that an item, term, etc., can be either X, Y, and Z, or any combination thereof (e.g., X, Y, and/or Z). Thus, as used herein, such phrases are not generally intended to, and should not, imply that certain embodiments require at least one of either X, Y, or Z to be present, but not, for example, one X and one Y. Further, such phrases should not imply that certain embodiments require each of at least one of X, at least one of Y, and at least one of Z to be present.

Although embodiments have been described herein in detail, the descriptions are by way of example. The features of the embodiments described herein are representative and, in alternative embodiments, certain features and elements may be added or omitted. Additionally, modifications to aspects of the embodiments described herein may be made by those skilled in the art without departing from the spirit and scope of the present disclosure defined in the following claims, the scope of which are to be accorded the broadest interpretation so as to encompass modifications and equivalent structures.

The invention claimed is:

1. A double-decker chip tray comprising:

at least one RFID tag antenna configured to read gaming chips, the gaming chips including two types of gaming chips that incorporate an RFID tag and that have different shapes and sizes;

an upper chip tray configured to accommodate the gaming chips; and a lower chip tray configured to accommodate the gaming chips, wherein:

the two types of gaming chips include a circular gaming chip and a rectangular plaque, each gaming chip of the gaming chips incorporates the RFID tag that stores a denomination of the gaming chip, the upper chip tray has at least one first gaming chip storage row corresponding to the circular gaming chip for accommodating the circular gaming chip, the lower chip tray has at least one second gaming chip storage row corresponding to the rectangular plaque for accommodating the rectangular plaque, and the at least one RFID antenna is configured to read each of the RFID tags of the circular gaming chips and the rectangular plaques, which are the two types of gaming chips accommodated in the double-decker chip tray.

2. The double-decker chip tray according to claim 1, wherein the at least one RFID antenna comprises a first RFID antenna configured to read the RFID tags of the gaming chips housed in the upper chip tray and a second RFID antenna configured to read the RFID tags of the gaming chips housed in the lower chip tray.

3. The double-decker chip tray according to claim 1, wherein the at least one RFID antenna comprises one RFID antenna configured to read both of the RFID tags of the gaming chips housed in the upper chip tray and the RFID tags of the gaming chips housed in the lower chip tray.

4. The double-decker chip tray according to claim 1, wherein the at least one RFID antenna is configured to determine denominations of the two types of gaming chips by reading the RFID tags.

5. The double-decker chip tray according to claim 1, wherein the double-decker chip tray has a portion where the first gaming chip storage row and the second gaming chip storage row are adjacent to each other.

6. The double-decker chip tray according to claim 1, wherein the second gaming chip storage row corresponding to the rectangular plaque is configured to support a flat surface of the rectangular plaque.

7. The double-decker chip tray according to claim 1, further comprising a collection chip tray configured to temporarily store gaming chips collected from players who have lost a game.

8. The double-decker chip tray according to claim 1, further comprising:

a camera configured to generate an image of sides of the gaming chips stored in the double-decker chip tray; and a processor configured to identify the denomination of the gaming chips by analyzing the image generated by the camera.

9. The double-decker chip tray according to claim 8, wherein, to inspect the gaming chip, the processor is further configured to compare the denomination obtained from the image generated by the camera with the denomination obtained from the RFID tag.

10. The double-decker chip tray according to claim 9, wherein the camera is configured to capture the sides of some of the gaming chips housed in the double-decker chip tray.

11. The double-decker chip tray according to claim 1, wherein:

the first gaming chip storage row is configured to vertically support the circular gaming chip, the second gaming chip storage row is configured to support the rectangular plaque vertically or horizontally, and the at least one RFID antenna is configured to read the circular gaming chip in a vertical position and the rectangular plaque in a vertical position or a flat position.

12. The double-decker chip tray according to claim 11, wherein the at least one RFID antenna is configured to read the RFID tag incorporated in any of the circular gaming chip or the rectangular plaque in the double-decker chip tray, whether when the circular gaming chip or the rectangular plaque is vertically supported or horizontally supported.

13. The double-decker chip tray according to claim 12, wherein:

the upper chip tray is configured to accommodate the circular gaming chip or the rectangular plaque in a vertically supported manner, and the at least one RFID antenna is configured to read the RFID tag incorporated in the circular gaming chip or the rectangular plaque supported vertically in the upper chip tray.

14. The double-decker chip tray according to claim 12, wherein:

the lower chip tray is configured to accommodate the circular gaming chip or the rectangular plaque in a vertically or horizontally manner, and the at least one RFID antenna is configured to read the RFID tag incorporated in the circular gaming chip or the rectangular plaque supported vertically or horizontally in the lower chip tray.

15. The double-decker chip tray according to claim 14, wherein the at least one RFID antenna is configured to read the RFID tag of the circular gaming chip or the rectangular plaque supported horizontally in the upper chip tray.

16. The double-decker chip tray according to claim 1, wherein, based on reading of the RFID tag, a total amount of each of the circular gaming chip and the rectangular plaque accommodated in the double-decker chip tray is determined.

17. The double-decker chip tray according to claim 1, further comprising a link mechanism configured to connect the upper chip tray to the lower chip tray and move the upper chip tray between a position where the upper chip tray covers the lower chip tray from above and a position where the upper chip tray is displaced from the lower chip tray to open a top surface of the lower chip tray.

18. The double-decker chip tray according to claim 1, further comprising a display configured to show a number and an amount of gaming chips read by the at least one RFID antenna.

* * * * *